(12) United States Patent
Hayami

(10) Patent No.: US 9,696,978 B2
(45) Date of Patent: Jul. 4, 2017

(54) INFORMATION PROCESSING APPARATUS, APPLICATION MANAGEMENT METHOD, AND NON-TRANSITORY COMPUTER-READABLE MEDIUM

(71) Applicant: CANON KABUSHIKI KAISHA, Tokyo (JP)

(72) Inventor: Yoshikazu Hayami, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/722,341

(22) Filed: May 27, 2015

(65) Prior Publication Data
US 2015/0355894 A1 Dec. 10, 2015

(30) Foreign Application Priority Data

Jun. 5, 2014 (JP) ................................ 2014-117097

(51) Int. Cl.
*G06F 9/445* (2006.01)
*G06F 9/44* (2006.01)
G06F 21/12 (2013.01)
G06F 21/60 (2013.01)

(52) U.S. Cl.
CPC .................. *G06F 8/61* (2013.01); *G06F 8/62* (2013.01); *G06F 9/4443* (2013.01); *G06F 9/44526* (2013.01); *G06F 21/121* (2013.01); *G06F 21/608* (2013.01); *G06F 2221/2141* (2013.01)

(58) Field of Classification Search
CPC . G06F 8/61; G06F 8/62; G06F 21/121; G06F 21/608; G06F 2221/2141; G06F 9/443; G06F 9/44526
See application file for complete search history.

(56) References Cited

U.S. PATENT DOCUMENTS

| | | | |
|---|---|---|---|
| 8,966,472 B2 | 2/2015 | Hayami | |
| 2003/0167320 A1* | 9/2003 | Perez | G06F 9/465 709/223 |
| 2007/0006219 A1 | 1/2007 | Sinha et al. | |
| 2007/0073627 A1* | 3/2007 | Richards | G06F 21/125 705/59 |
| 2011/0004874 A1* | 1/2011 | Nakashima | G06F 21/121 717/175 |

(Continued)

OTHER PUBLICATIONS

Aug. 25, 2015 European Search Report in European Patent Appln. No. 15001293.8.

*Primary Examiner* — Viva Miller
(74) *Attorney, Agent, or Firm* — Fitzpatrick, Cella, Harper & Scinto

(57) ABSTRACT

An information processing apparatus in which an application operates, comprises: a framework that causes a first application and a second application for extending the first application to operate; and installation control unit configured to control installation of an application into the framework, wherein the installation control unit holds data of the second application in a first storage area in a case of receiving an instruction to install the second application, and installs the second application into the framework using the data of the second application held in the first storage area, in a case of receiving an instruction to activate the second application after receiving the instruction to install the second application.

10 Claims, 20 Drawing Sheets

(56) References Cited

U.S. PATENT DOCUMENTS

| | | | |
|---|---|---|---|
| 2011/0035742 A1* | 2/2011 | Shenfield | G06F 9/44521 |
| | | | 717/171 |
| 2011/0072421 A1* | 3/2011 | Parry | G06F 8/65 |
| | | | 717/168 |
| 2014/0082608 A1* | 3/2014 | Hayami | G06F 13/12 |
| | | | 717/175 |
| 2015/0261523 A1* | 9/2015 | Liu | H04L 67/10 |
| | | | 717/169 |

* cited by examiner

F I G. 3
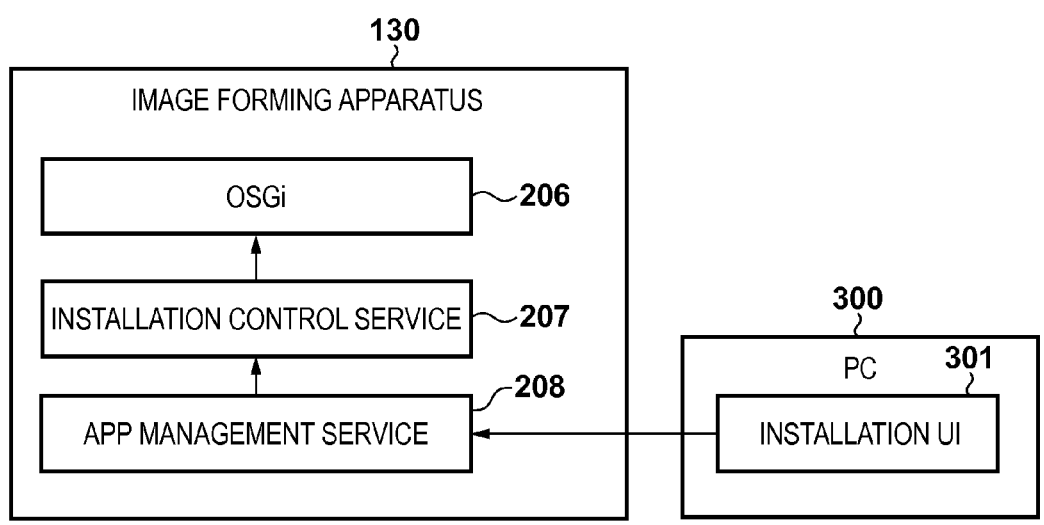

F I G. 6
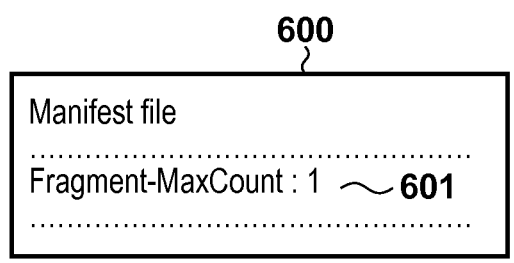

F I G. 15
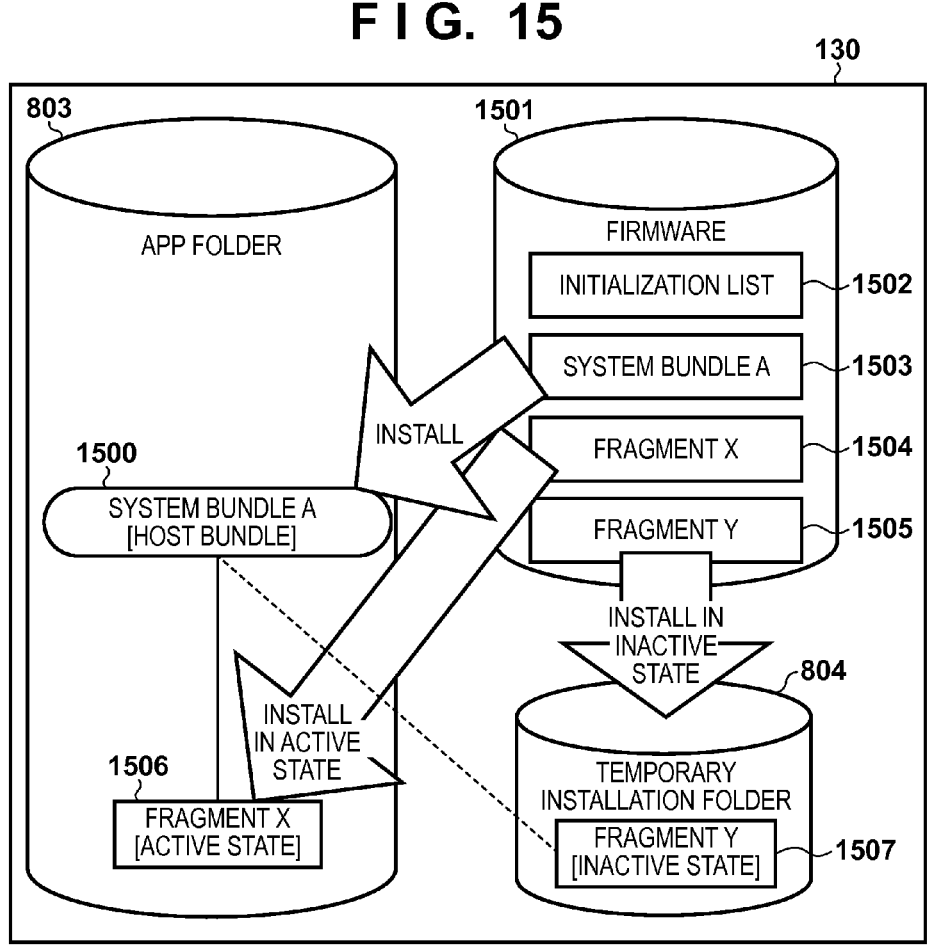
F I G. 16
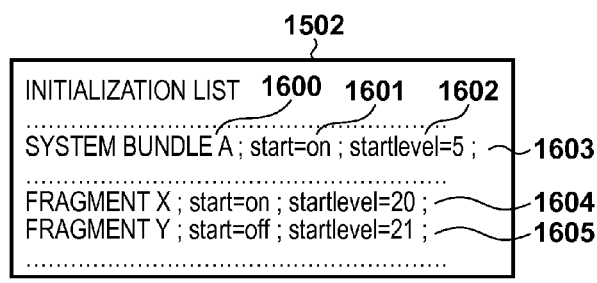

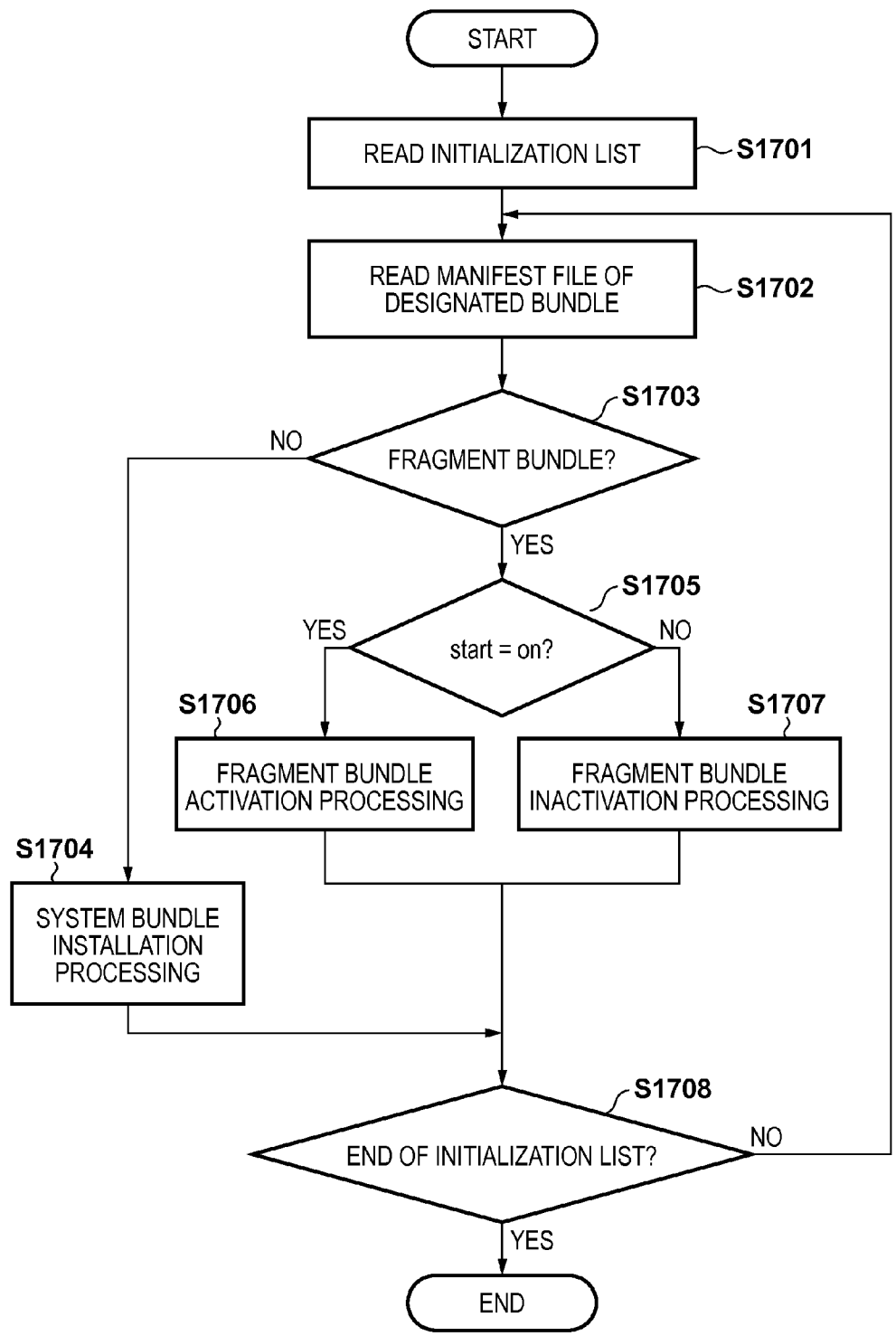
F I G. 17

CURRENTLY ACTIVE FRAGMENT BUNDLE WILL BE INACTIVATED,
AND ACTIVATION PROCESSING WILL BE CONTINUED.
ARE YOU SURE?

| YES | NO |
|---|---|
| 2101 | 2102 |

HERE IS LIST OF CURRENTLY ACTIVE FRAGMENT BUNDLES.
PLEASE SELECT ONE OR MORE FRAGMENT BUNDLES TO BE INACTIVATED.

☐ FRAGMENT BUNDLE X ～2201
☑ FRAGMENT BUNDLE Y ～2202

| OK | CANCEL |
|---|---|
| 2203 | 2204 |

INFORMATION PROCESSING APPARATUS, APPLICATION MANAGEMENT METHOD, AND NON-TRANSITORY COMPUTER-READABLE MEDIUM

BACKGROUND OF THE INVENTION

Field of the Invention

The present invention relates to an information processing apparatus, an application management method, and a non-transitory computer-readable medium.

Description of the Related Art

In recent years, in the field of image forming apparatuses, operating environments, which are represented by a Java (registered trademark) environment, for applications (hereinafter referred to simply as "apps") have been provided. A technique has been proposed of providing an extendable app using portability of a program that Java (registered trademark) has. In order to improve functions and usability of an image forming apparatus, an app that operates in an environment such as a Java (registered trademark) environment is generated and installed into the image forming apparatus, and a desired function can thereby be achieved by this app.

App platforms include an OSGi (Open Services Gateway Initiative) Service Platform, which is a Java (registered trademark) platform for embedded devices. The OSGi defines a bundle as a software module management unit, and defines specifications for managing a life cycle including installation, start, stop, update, and uninstallation. This kind of app platform can provide an app with an embedded function such as copying, scanning, and printing.

The OSGi has mechanisms called a host bundle and a fragment bundle. The fragment bundle is a bundle in a form in which the bundle does not independently operate and a bundle itself is added (attached) to a class loader space of a host bundle. When correcting or extending the app, a function of the host bundle is corrected or extended using the fragment bundle, and it is thereby possible to reduce the size of a file to be installed and efficiently distribute a module. On the other hand, the host bundle refers to a bundle that is a target to which the fragment bundle is added. Since the fragment bundle does not independently operate, it does not have a concept of start and stop either. Accordingly, the fragment bundle cannot be used in a manner that the bundle is installed but is not started until it is used, and the bundle is first started at the time of use, as in the case of the host bundle. Furthermore, the number of fragment bundles that can be installed for a host bundle is not particularly restricted in the specifications of the OSGi.

Here, there has been a demand that, as in the case of the host bundle, entities of a plurality of fragment bundles (for example, jar files) are held but a state of not being attached to the host bundle (hereinafter referred to as "temporary installation") is maintained, and then, the fragment bundle is first set in a usable state at the time of use, i.e., a state of being attached (installed) to the host bundle. If this is achieved, a plurality of fragment bundles can be temporarily installed, and a fragment bundle to be used can be selected and installed as needed by a user. The amount of use of resources can also be suppressed until the fragment bundle is actually installed. However, the specifications of the OSGi do not include a function that meets this demand (problem 1).

Furthermore, there has been a demand to achieve a state in which the fragment bundles are temporarily installed in advance into the image forming apparatus, without the user installing the fragment bundles. A fragment bundle to be used will be able to be selected from among the fragment bundles installed in advance, and installed as needed by the user. However, the specifications of the OSGi do not include a function that meets this demand (problem 2).

Furthermore, the specifications of the OSGi do not include a mechanism for restricting the number of fragment bundles that can be added to one host bundle. For this reason, in the case where an app exists whose function is assumed to be extended by a fragment bundle and a trial version of this app is to be used by a user, the trial version cannot be differentiated from a regular version of the app by providing a certain restriction on the number of addable fragment bundles. Accordingly, when installing a temporarily installed fragment bundle in the host bundle, the number of installable fragment bundles cannot be restricted (problem 3).

SUMMARY OF THE INVENTION

According to one aspect of the present invention, there is provided an information processing apparatus in which an application operates, comprising: a framework that causes a first application and a second application for extending the first application to operate; and installation control configured to control installation of an application into the framework, wherein the installation control unit holds data of the second application in a first storage area in a case of receiving an instruction to install the second application, and installs the second application into the framework using the data of the second application held in the first storage area, in a case of receiving an instruction to activate the second application after receiving the instruction to install the second application.

According to another aspect of the present invention, there is provided a method for managing an application in an information processing apparatus, the information processing apparatus including a framework that causes a first application and a second application for extending the first application to operate, the method comprising: holding data of the second application in a first storage area in a case of receiving an instruction to install the second application; and installing the second application into the framework using the data of the second application held in the first storage area, in a case of receiving an instruction to activate the second application after receiving the instruction to install the second application.

According to another aspect of the present invention, there is provided a non-transitory computer-readable medium storing a program for causing a computer including a framework, which causes a first application and a second application for extending the first application to operate, to execute: holding data of the second application in a first storage area in a case of receiving an instruction to install the second application; and installing the second application into the framework using the data of the second application held in the first storage area, in a case of receiving an instruction to activate the second application after receiving the instruction to install the second application.

According to the present invention, a plurality of fragment bundles can be temporarily installed, and furthermore, the fragment bundles can be installed for a host bundle as needed by a user.

Further features of the present invention will become apparent from the following description of exemplary embodiments with reference to the attached drawings.

BRIEF DESCRIPTION OF THE DRAWINGS

FIG. 3 is a diagram showing a flow of installation of an app.

FIG. 6 is a diagram showing a manifest file that designates an upper limit number of fragment bundles.

FIG. 15 is a block diagram for illustrating a second embodiment.

FIG. 16 is a diagram showing an initialization list according to the second embodiment.

FIG. 17 is a processing flowchart of an installer control service according to the second embodiment.

FIG. 21 is a diagram showing an exemplary dialog configuration according to the third embodiment.

FIG. 22 is a diagram showing an exemplary dialog configuration according to the third embodiment.

DESCRIPTION OF THE EMBODIMENTS

Hereinafter, modes for carrying out the present invention will be described using the drawings. First, terms used in this specification are defined. In this specification, a description is given, assuming use of an OSGi framework as a Java (registered trademark) platform, and an "app", a "bundle", and a "module" are assumed to have the same meaning. Specifically, the "module" here corresponds to a Java module.

A "host bundle" is a bundle to serve as a target to which a fragment bundle is added. A "fragment bundle" is a bundle that does not independently operate and adds itself to a class loader space of the host bundle. Addition of the fragment bundle to the host bundle (i.e., attachment thereof to the host bundle) will be hereinafter referred to as "installation of the fragment bundle". Similarly, deletion of the fragment bundle in a state of having been added to the host bundle will be hereinafter referred to as "uninstallation of the fragment bundle".

The specifications of the OSGi provide a relationship in which "host bundle:fragment bundle=1:N". Also, in the specifications of the OSGi, the fragment bundle can be added to only one host bundle. Furthermore, a state called "temporary installation" exists in addition to the aforementioned installation and uninstallation. This temporary installation refers to a state where an entity of the fragment bundle is held but the fragment bundle has not been attached (installed) to the host bundle. Note that "installation" or "uninstallation" of a target other than the fragment bundle does not mean the aforementioned "attachment".

In this specification, for the sake of convenience, the host bundle will also be referred to as a "first application", and the fragment bundle will also be referred to as a "second application".

Hardware Configuration

Figure 1:
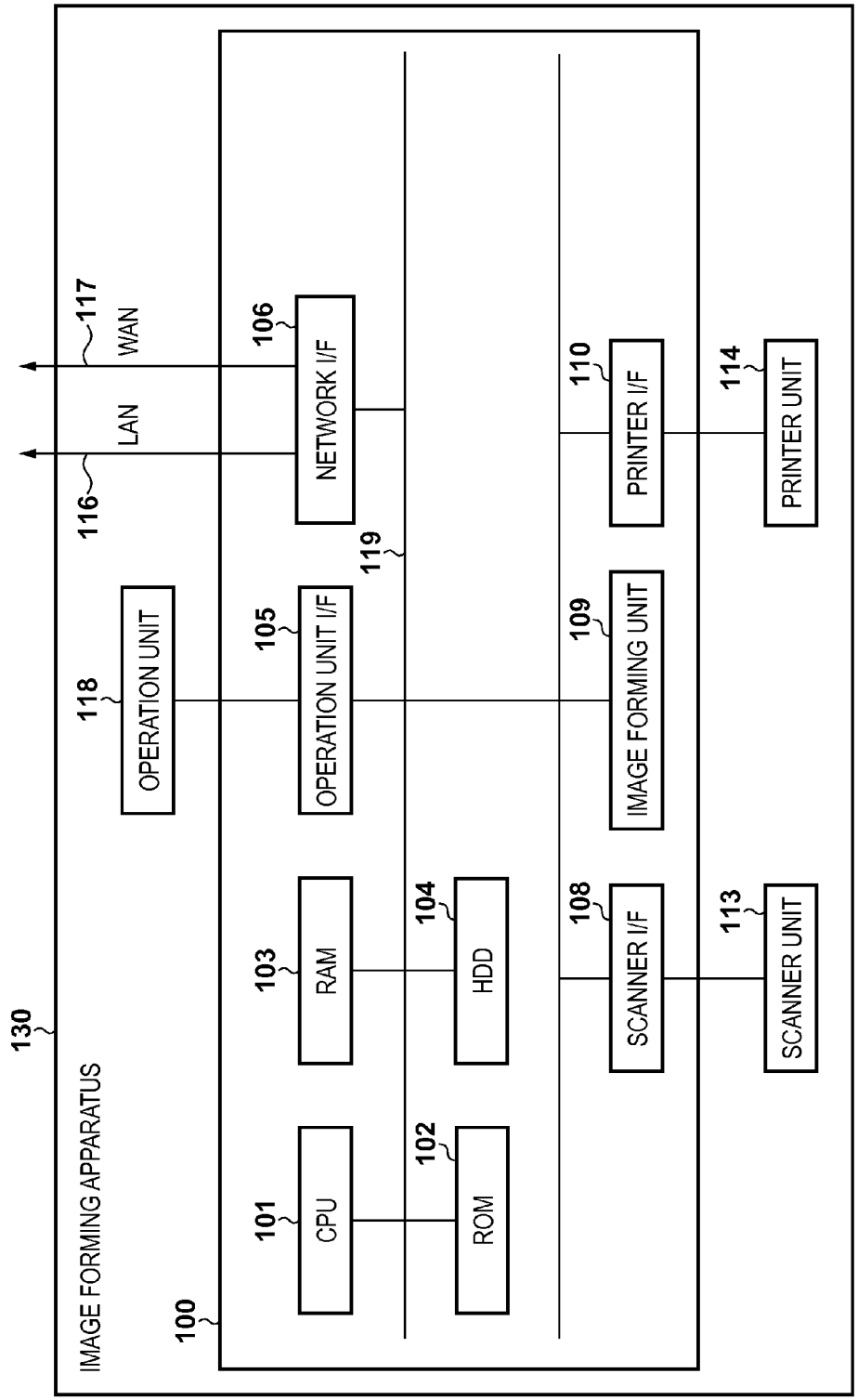
FIG. 1 is a diagram showing an exemplary hardware configuration of an image forming apparatus according to the present invention.

FIG. 1 is a diagram showing an exemplary hardware configuration of an image forming apparatus 130 that includes a print function, a scan function, a network communication function, and the like. The image forming apparatus 130 may be any kind of device, e.g., an MFP (Multi Function Peripheral) or a network device such as a network printer. In FIG. 1, a controller 100 controls the overall image forming apparatus 130. The controller 100 is electrically connected to a scanner unit 113 and a printer unit 114, and, on the other hand, is connected to an external device via a LAN 116.

A CPU 101 comprehensively controls access to various kinds of connected hardware based on a control program or the like stored in a ROM 102, and also comprehensively controls various kinds of processing performed within the controller 100. The ROM 102 is a read-only nonvolatile storage area, and stores a boot program of the image forming apparatus 130 or the like. A RAM 103 is a system work memory with which the CPU 101 operates, and is a memory for temporarily storing various data. The RAM 103 is constituted by an FRAM (registered trademark) and an SRAM that can hold stored content even after the power is turned off, or a DRAM or the like in which stored content is erased after the power is turned off. An HDD 104 is a nonvolatile storage area, and stores a system app or the like. Firmware including a later-described installation target app is stored in the HDD 104.

An operation unit I/F 105 is an interface unit that connects a system bus 119 to an operation unit 118. Specifically, the operation unit I/F 105 receives data to be displayed on the operation unit 118 from the system bus 119 and causes the operation unit 118 to display the data, and outputs input information from the operation unit 118 to the system bus 119. A user instruction given to the image forming apparatus 130 and information presentation are received via the operation unit 118. A network I/F 106 is connected to a LAN 116, a WAN 117, and the system bus 119, and inputs and outputs information from/to the outside. A scanner I/F 108 transmits image data received from the scanner unit 113 to the image forming unit 109. The image forming unit 109 performs direction conversion, image compression, expansion, drawing, or the like of the image data. A printer I/F 110 receives the image data transmitted from the image forming unit 109 and transmits the image data to the printer unit 114 after image formation. The printer unit 114 prints the received image data.

Note that a PC 300 shown in FIG. 3, which is an information processing apparatus operated by a user, need only be a general one in which a Web browser operates, and a description of hardware and software configurations thereof will be omitted here.

Software Configuration

Figure 2:
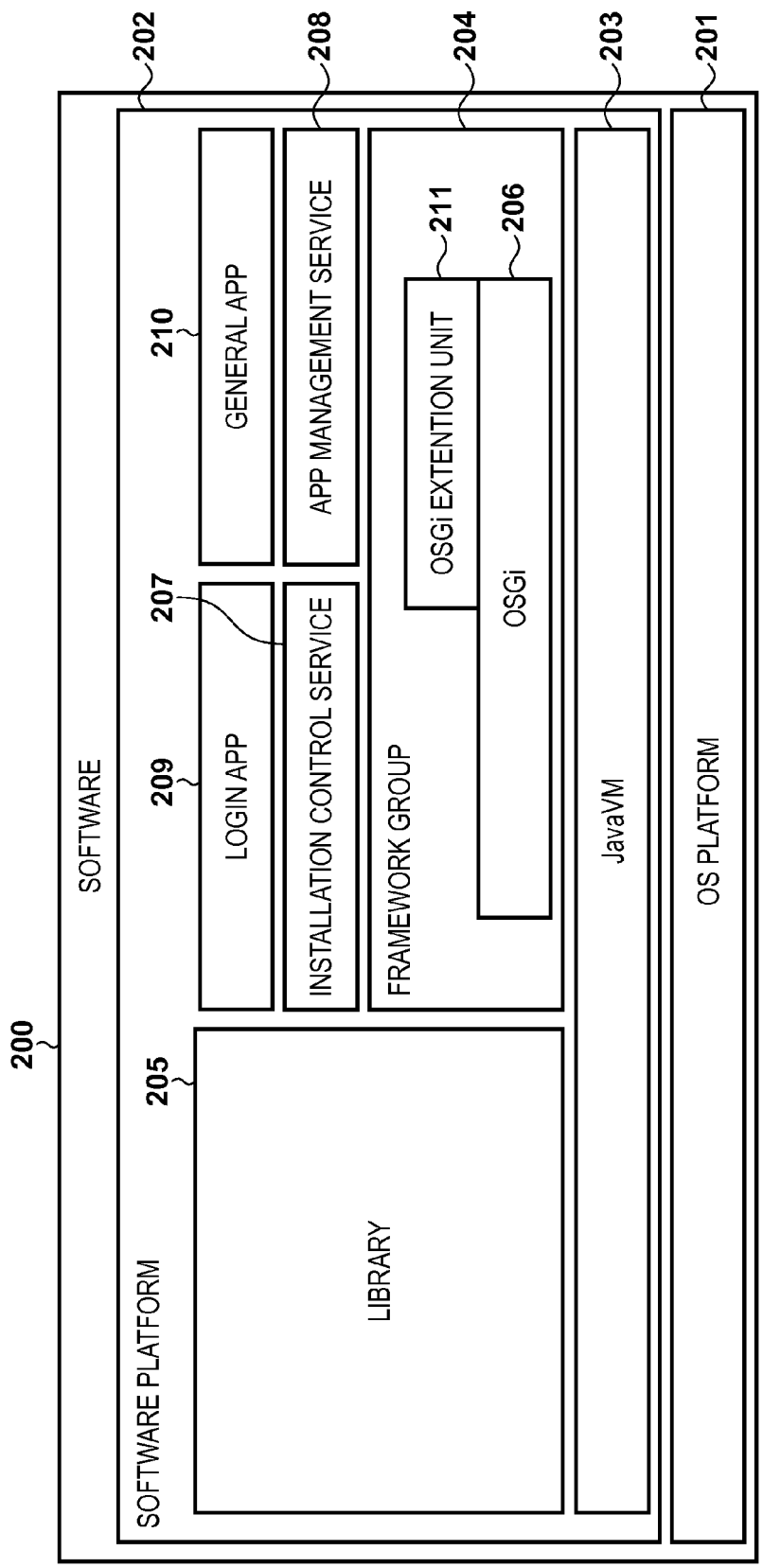
FIG. 2 is a diagram showing a hierarchical configuration of software of the image forming apparatus according to the present invention.

FIG. 2 is a diagram showing a hierarchical configuration of software in the image forming apparatus 130. Note that the software shown in FIG. 2 and subsequent drawings are saved in the ROM 102 or the HDD 104, and is read out and executed by the CPU 101. Various kinds of information used at the time of execution are held in the RAM 103 or the HDD 104, and the information is exchanged among software functions. Furthermore, communication with an external device is performed using the network I/F 106.

Software 200 has an operating system (OS) platform 201, and a software platform 202 is configured on the OS platform 201. The software platform 202 is configured as a runtime environment of a JavaVM 203, and is configured to include a JavaVM 203 serving as an interpreter, a framework group 204, and a library 205. The library 205 is configured to include a standard API (Application Programming Interface) library. The framework group 204 is configured to include OSGi 206 as one framework. The OSGi 206 causes a plurality of apps to operate on the single JavaVM 203. Furthermore, an OSGi extension unit 211 can extend a function of the OSGi 206 as necessary. The OSGi 206 provides a function of managing an app life cycle, communication among apps, and the like. A plurality of system services are preinstalled on the OSGi 206. The system services include an app management service 208 for managing a plurality of app groups and adding a new app, as well as updating and deleting an app. The app management service 208 adds, updates, and deletes an app in conjunction with an installation control service 207. When the image forming apparatus 130 is started, the OSGi 206 starts services such as a login app 209, the installation control service 207, and the app management service 208 in accordance with a service start order list (not shown) saved in the HDD 104. Note that the framework group 204 may include a framework other than the OSGi 206, and a description thereof will be omitted here.

A general app 210 provides various kinds of processing to the user in the image forming apparatus 130. For example, the general app 210 is an image processing/compression app, an app that performs department management such as print restriction, or the like. Other installed apps include the login app 209 that manages a logged-in user. The login app 209 is an app having a characteristic of being unable to stop in order to be ready for an inquiry about login information at any timing from any app during login. If the login app has stopped, the login information cannot be obtained, and accordingly, if, for example, an app using data associated with the login information exists, this app fails to obtain data and a trouble occurs in operations thereof. The login information mentioned here refers to information of a login name, an email address, and the like of a user who has currently logged in to the image forming apparatus 130. Since the login app 209 has the above-described characteristic, one login app 209 always operates while the image forming apparatus 130 has been started.

The general app 210 that achieves various functions operates under the management of the app management service 208. The app management service 208 holds app information including a version of an added app under the management thereof, license information, or the like. Furthermore, the app management service 208 replies to an uninstallation instruction of an app within the image forming apparatus 130, and performs processing for removing the general app 210 from management targets. The general app 210 and the login app 209 can be provided in the form of a host bundle and a fragment bundle, which will be described later using FIG. 4. The installation control service 207 controls installation and uninstallation of various apps. Detailed cooperation between the installation control service 207, the app management service 208, and the OSGi 206 will be described later using the drawings.

App Installation

FIG. 3 is a conceptual diagram showing a flow in which a user installs an app into the image forming apparatus 130 from the PC 300. The user causes an app installation UI 301 constituted by a WEB page shown with an installation screen 530 in FIG. 5, to be displayed on a WEB browser (not shown) of the PC 300. The user gives an instruction to install an app into the image forming apparatus 130 by designating the app that the user wants to install from the installation UI 301. The app management service 208 that receives data of the app designated using the installation UI 301 delivers it to the installation control service 207. The installation control service 207 that receives the app data gives the OSGi 206 a request to install the app, and the OSGi 206 installs this app. The installed app is managed by the app management service 208.

Bundle Configuration

Figure 4:
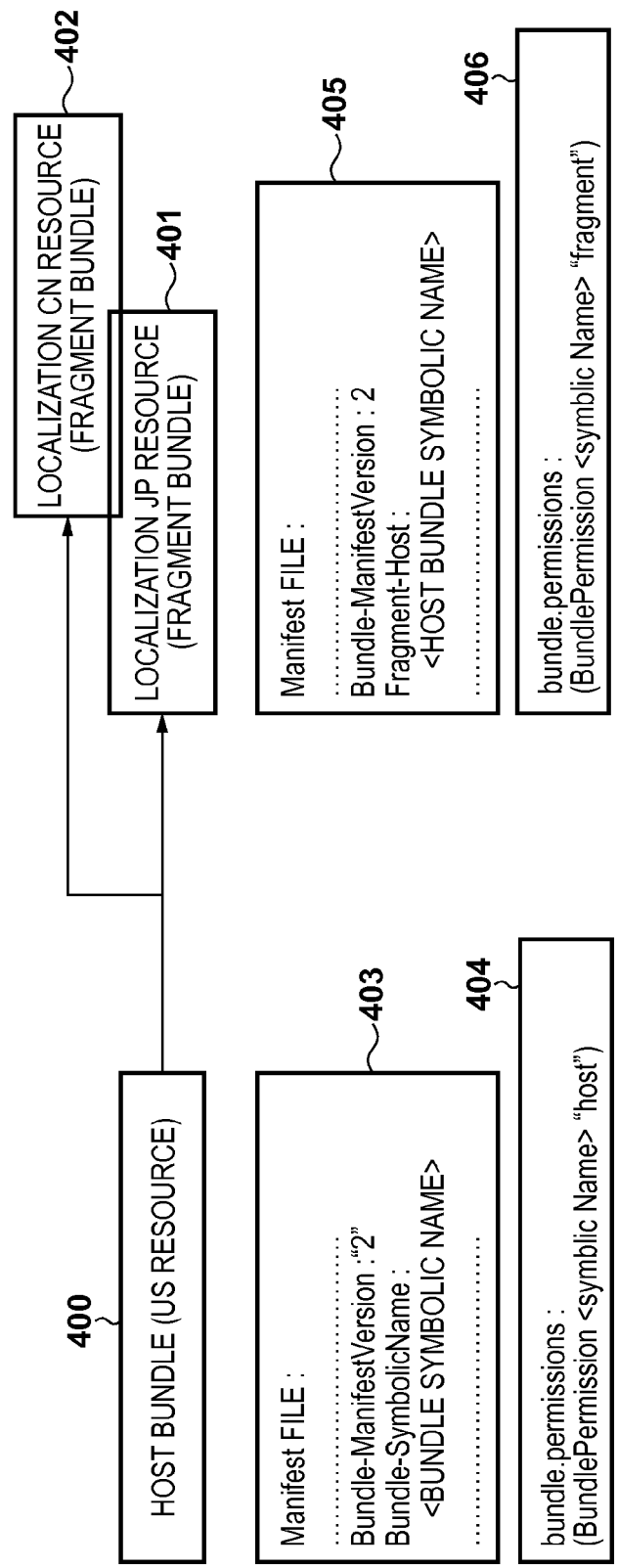
FIG. 4 is a conceptual diagram of a fragment bundle.

FIG. 4 is a diagram for illustrating a concept of the fragment bundle. Here, an example is shown in which two fragment bundles 401 and 402 having language localization resources are installed for a host bundle 400. Note that the language localization resources here refer to resources for adapting the host bundle 400 to languages of respective countries (in this example, Japanese and Chinese). In order to install the fragment bundle for the host bundle, the specifications of the OSGi require designation of manifest and bundle permission, which are described below.

A manifest file 403 of the host bundle
Bundle-ManifestVersion: "2" is designated
Bundle-SymbolicName: unique name within the framework is given
A manifest file 405 of the fragment bundle
Bundle-ManifestVersion: "2" is designated
Fragment-Host: <host bundle symbolic name> described in the manifest file 403 of the host bundle is designated. Coincidence of this value indicates that the host bundle and the fragment bundle are constituent elements of the same app.
Permission 404 of the host bundle
BundlePermission: [bundle symbolic name, HOST]
Permission 406 of the fragment bundle
BundlePermission: [bundle symbolic name, FRAGMENT]

If the fragment bundle is installed in a state that satisfies the above conditions, the OSGi 206 specifies the host bundle from manifest information of the fragment bundle, and adds a class path of the fragment bundle itself to a class path of the host bundle. Here, the "class path" is information for designating the location from which JavaVM is to read a class file when a Java (registered trademark) app is executed. Furthermore, all classes and resources within the fragment bundle are loaded by a class loader of the host bundle. Here, the "class loader" is an object that is in charge of loading of a class and searching for a resource. All classes are loaded into the JavaVM by the class loader, and are available from the app. Note that the loading of the host bundle by the class loader is executed at the time of starting the host bundle, and accordingly the host bundle needs to be stopped once and loaded after adding the class path thereto. Accordingly, if the host bundle has not been stopped, installation will fail. After the fragment bundle is installed, it can be used as a part of the host bundle.

In this example, a Japanese resource and a Chinese resource are installed (attached) as the fragment bundles 401 and 402 for the host bundle 400. After the installation, the host bundle 400 can switch the resource language, using these Japanese resource and Chinese resource that serve as the language localization resources. That is to say, although default display of the UI of the host bundle 400 is in English, the host bundle is extended such that Japanese display and Chinese display are available, by designating switching of the resources on the UI of the host bundle 400. Note that the resources are not limited to the language resources described here, but may also be image resources. Although an image of English display is used as default, the display can be switched to Japanese or Chinese image display by designating switching of the resources on the UI of the host bundle 400. A fragment bundle for this kind of purpose is called a "resource fragment bundle". Furthermore, not only such addition of a resource but also extension of the like of an app function are also possible. For example, a function of a UI provided as a default function can be extended so as to be a richer UI, by adding a fragment bundle. A fragment bundle for this kind of purpose is called a "function extension fragment bundle".

Furthermore, as an example in the case where the host bundle is the login app 209, a host bundle portion is in charge of basic login-related processing. On the other hand, a configuration can also be employed in which a fragment bundle portion compliments a UI portion such as IC card authentication with which, for example, a user holds an IC card and logs in using information described in this IC card.

In the case of uninstallation of the fragment bundle as well, similarly, it is necessary to deleting the class path of the fragment bundle itself from the class path of the host bundle, and furthermore to again load a class necessary for the host bundle, using the class loader of the host bundle. For this reason, uninstallation of the fragment bundle always needs to be performed in a state where the host bundle is stopped.

UI Screen

Figure 5:
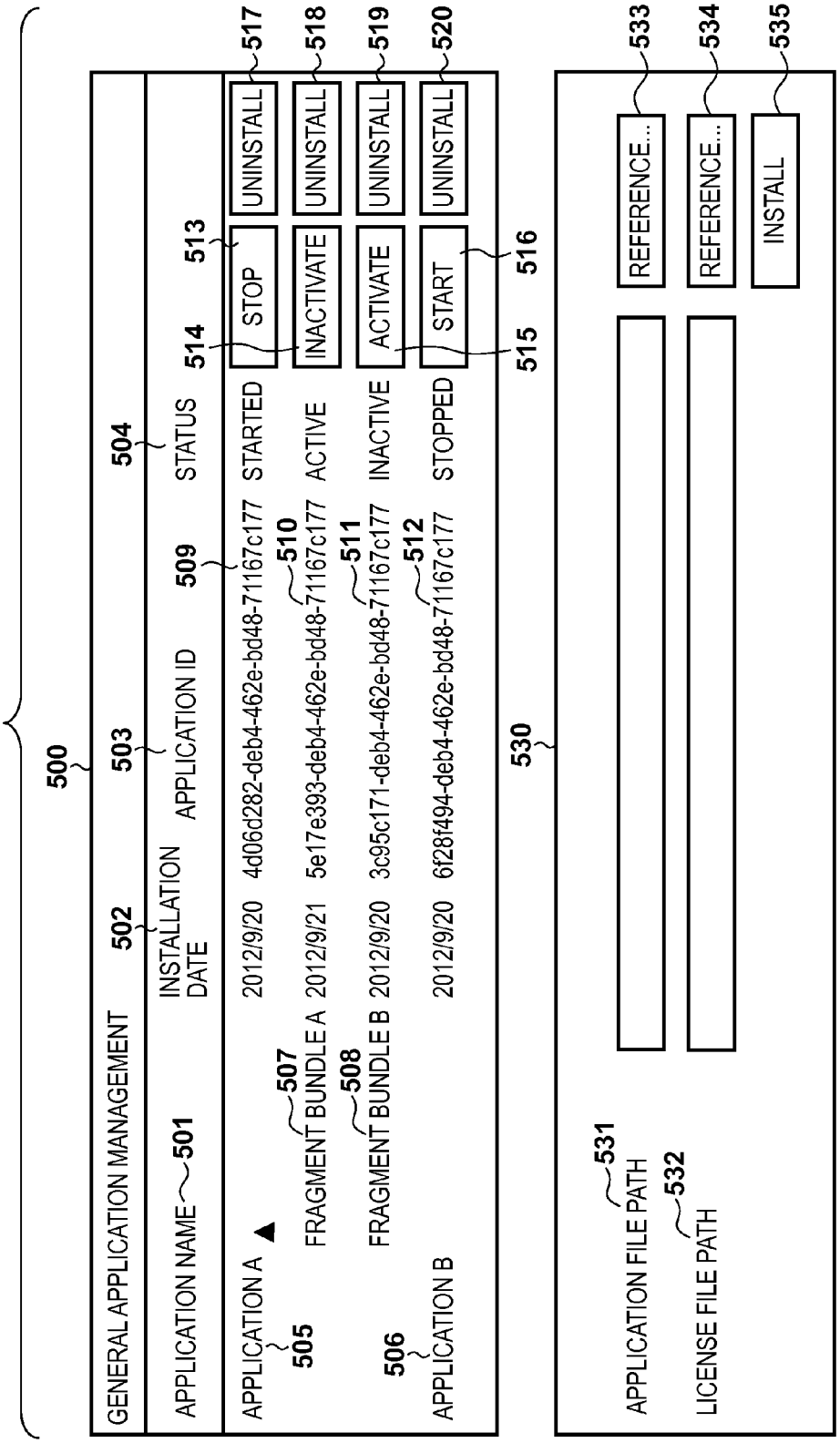
FIG. 5 is a diagram showing an exemplary configuration of an app management screen and an installation screen.

FIG. 5 is a diagram showing an app management screen 500 and an installation screen 530 for the general app 210 in the app management service 208. Although the management screen for the general app 210 is described here, a similar screen is also used as the management screen for the login app 209.

First, the app management screen 500 for the general app 210 will be described. An application name 501 indicates names of managed general apps. In the case of this example, two applications, namely an application A 505 and an application B 506 are managed. Furthermore, a fragment bundle A 507 and a fragment bundle B 508 are managed with the application A 505 as a host bundle. In this case, the fragment bundle A 507 and the fragment bundle B 508 are displayed in association with the application A 505 such that these fragment bundles are associated with their host bundle. An installation date 502 indicates the date on which each app was installed. An application ID 503 indicates an application ID uniquely assigned to each app.

Status 504 indicates the status of each app. If the status of an app that is a host bundle is "started", "started" is displayed as the status 504, and if the status thereof is "stopped", "stopped" is displayed as the status 504. Regarding a fragment bundle, "active" is displayed if a fragment bundle has been installed (attached) for the host bundle, and "inactive" is displayed if a fragment bundle is in a temporarily installed state. A start button 516 and a stop button 513 are instruction buttons for switching between "start" and "stop" of an app that is a host bundle. In the case of an app in a state of having been started, the stop button is displayed, and in the case of an app in a state of having been stopped, the start button is displayed. An activation button 515 and an inactivation button 514 are instruction buttons for switching between "active" and "inactive" of a fragment bundle.

Regarding the buttons shown in this example, specifically, if the stop button 513 of an app in a state of having been started (in this example, "application A 505") is pressed, the status 504 thereof is changed to "stopped". On the other hand, if the start button 516 of an app in a state of having been stopped (in this example, "application B 506") is pressed, the status 504 thereof is changed to "started". If the inactivation button 514 of an app in an active state (in this example, "fragment bundle A 507") is pressed, the status 504 thereof is changed to "inactive". On the other hand, if the activation button 515 of an app in an inactive state (in this example, "fragment bundle B 508") is pressed, the status 504 thereof is changed to "active".

Uninstallation buttons 517 to 520 are instruction buttons for giving instructions to uninstall respective apps. Targets of fragment bundle uninstallation are only fragment bundles. For example, if the uninstallation button 518 of the fragment bundle A 507 is pressed, only the fragment bundle A 507 is uninstalled. On the other hand, when pressing the uninstallation button 517 of the application A 505, which is a host bundle, not only the application A 505 but also the fragment bundle A 507 and the fragment bundle B 508 that are associated with the application A 505 are simultaneously uninstalled.

Next, the installation screen 530 will be described. A reference button 533 causes a screen (not shown) for selecting a file path to be displayed. Upon an app file being designated on this selection screen, a path to the app file is input as an application file path 531. Processing for installing an app requires a license file for decoding the app in some cases, from the viewpoints of security or business. In this case, if a reference button 534 is pressed, a screen (not shown) for selecting a file path is displayed. Upon a license file being designated on this selection screen, a path to the license file is input as a license file path 532. If an installation button 535 is pressed, installation of an app designated with the application file path 531 is started. If a fragment bundle is designated as an installation target, the fragment bundle is temporarily installed once.

Manifest File

FIG. 6 is a diagram showing a part of description of a manifest file 600 in the host bundle 400. In the manifest file 600, a version and a property value of a jar file of a Java (registered trademark) app are described. Also, the description in the manifest file 600 is given in a form of a manifest item and a value thereof. Note that a description that does not directly relate to the present invention in the description included in the manifest file will be omitted. An upper limit value (Fragment-MaxCount) 601 of the number of fragment bundles is one manifest item, and indicates the upper limit value of the number of fragment bundles (hereinafter referred to as "fragment upper limit value") that can be installed for the host bundle. In this example, "1" is designated as the fragment upper limit value. That is to say, it indicates that one fragment bundle can be installed. In the case where "*" is designated, which is a special value, it indicates a state where there is no restriction on the upper limit value. Since this manifest item has the meaning only for the host bundle, this item is not described in the case of a normal app and a fragment bundle that are not host bundles.

Management Configuration

Figure 7:
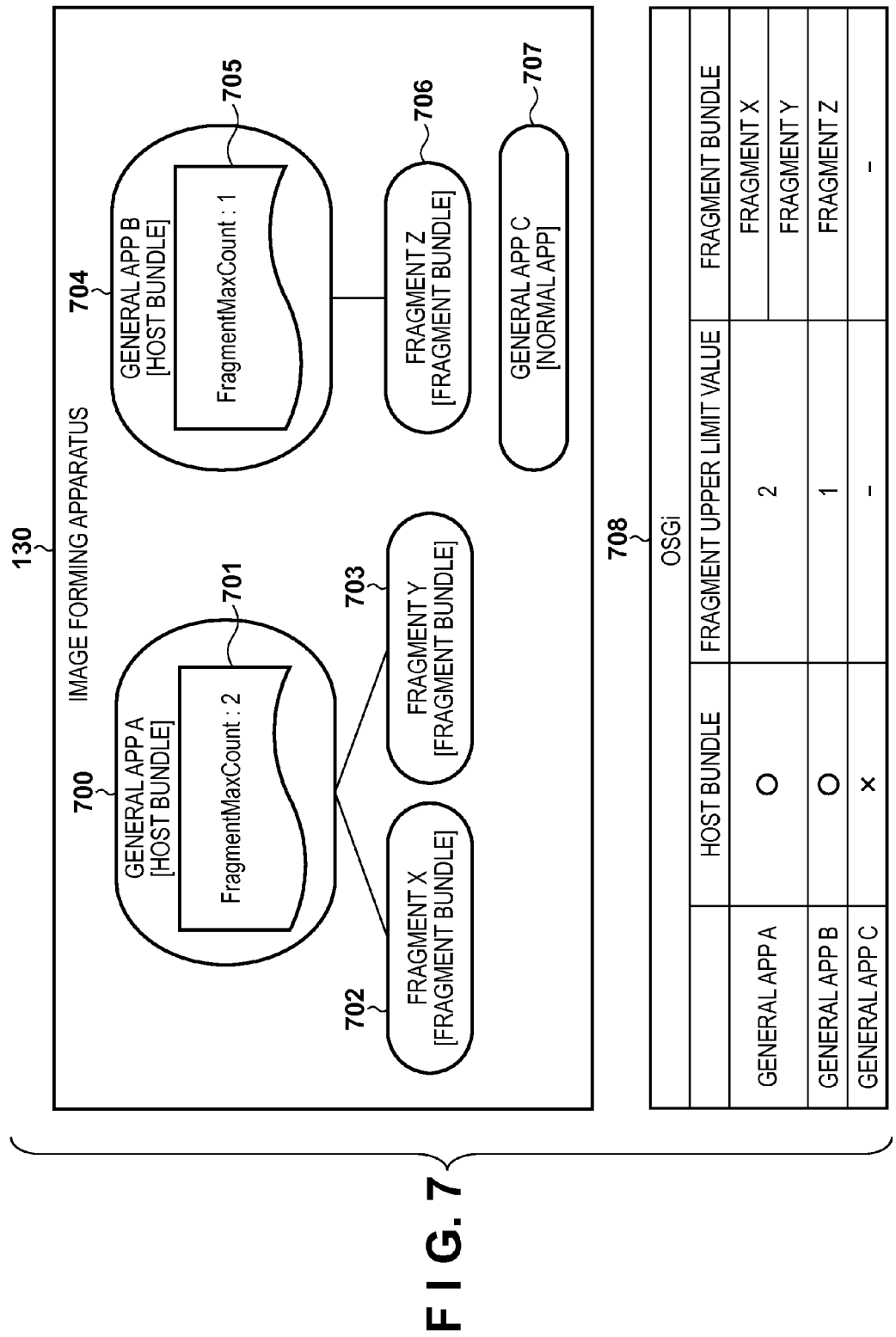
FIG. 7 is a diagram showing app management status in the OSGi.

FIG. 7 is a diagram showing status 708 of management of apps and values described in manifest files by the OSGi 206, in a memory. First, a description will be given of a complete picture of apps installed into the image forming apparatus 130 and managed by the OSGi 206. In this example, "2" is written as a fragment upper limit value 701 for a general app A 700 that is a host bundle. A fragment X 702 and a fragment Y 703 that are fragment bundles have been installed for the general app A 700. Similarly, "1" is written as a fragment upper limit value 705 for a general app B 704 that is a host bundle. A fragment Z 706 that is a fragment bundle has been installed for the general app B 704. Furthermore, a general app C 707 that is a normal app which is not a host bundle or a fragment bundle has been installed.

The OSGi 206 holds information indicated as the management status 708 in the memory. Specifically, information of whether or not an app is a host bundle, the fragment upper limit value described in the manifest file of the app, and relevance with a fragment bundle associated with the app in the case where the app is a host bundle are managed. These are designated using a target app name, an item value described in the manifest file, and the like as keys, and values associated therewith can thereby be obtained. The name of a target app and the status thereof can be obtained from the management status 708 of the OSGi 206.

The installation control service 207 can obtain information of relevance between a host bundle and a fragment bundle, the fragment upper limit value, the number of fragment bundles, and the like, by giving an inquiry to the OSGi 206. As an obtaining method, specifically, information of whether or not the general app A 700 is a host bundle can be obtained by designating the general app A and the host bundle as keys. The upper limit value "2" can also be obtained by designating the general app A and the fragment upper limit value as keys. The fragment X and the fragment Y associated with the general app A 700, and the number of fragments being "2" can be obtained by designating the general app A and the fragment bundle as keys.

First Embodiment

The present embodiment relates to temporary installation of a fragment bundle for a general app. Note that the present embodiment is an example of solving the aforementioned problem 1.

Figure 8:
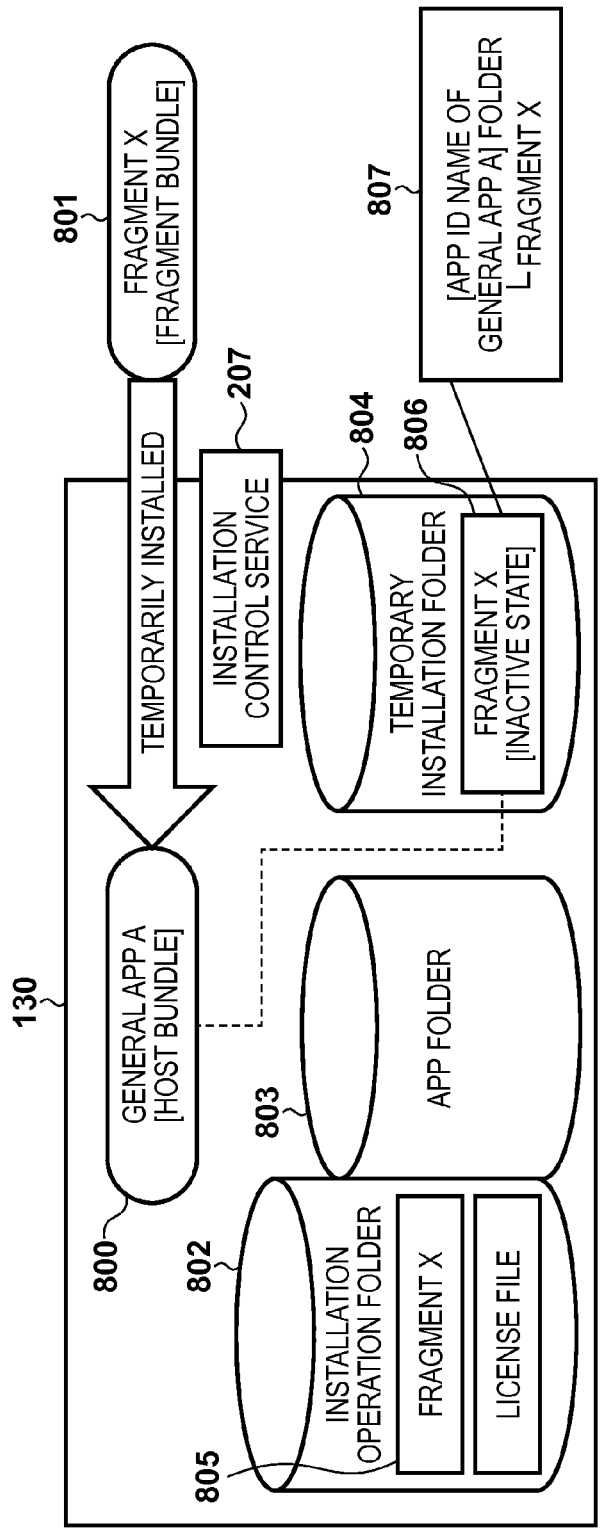
FIG. 8 is a block diagram for illustrating a first embodiment.

FIG. 8 is a block diagram for illustrating the present embodiment. FIG. 8 shows a case of temporarily installing a fragment X 801, which is a fragment bundle, for a general app A 800, which is a host bundle. Here, the image forming apparatus 130 has three storage areas, which are an installation operation folder 802, an app folder 803, and a temporary installation folder 804, and these storage areas are provided in the HDD 104 or the like. Roles of these storage areas and files (data) laid out therein will be described together with a processing flow.

Initially, the installation control service 207 decodes the fragment X 801 using a license file designated when receiving an installation instruction, and lays out the decoded fragment X 801 in the installation operation folder 802. Thereafter, the installation control service 207 specifies that the host bundle is the general app A 800, from host bundle information described in the manifest file of the decoded fragment X 805, and thereafter lays out the decoded fragment X 805 in the temporary installation folder 804. The fragment bundle laid out in the temporary installation folder 804 is in a temporarily installed state, and is not under the management of the OSGi 206 when in this state. As denoted by reference numeral 807, a fragment X 806 is laid out under a folder having a unique app ID of the general app A 800, which is a host bundle, as a folder name.

Figure 9:
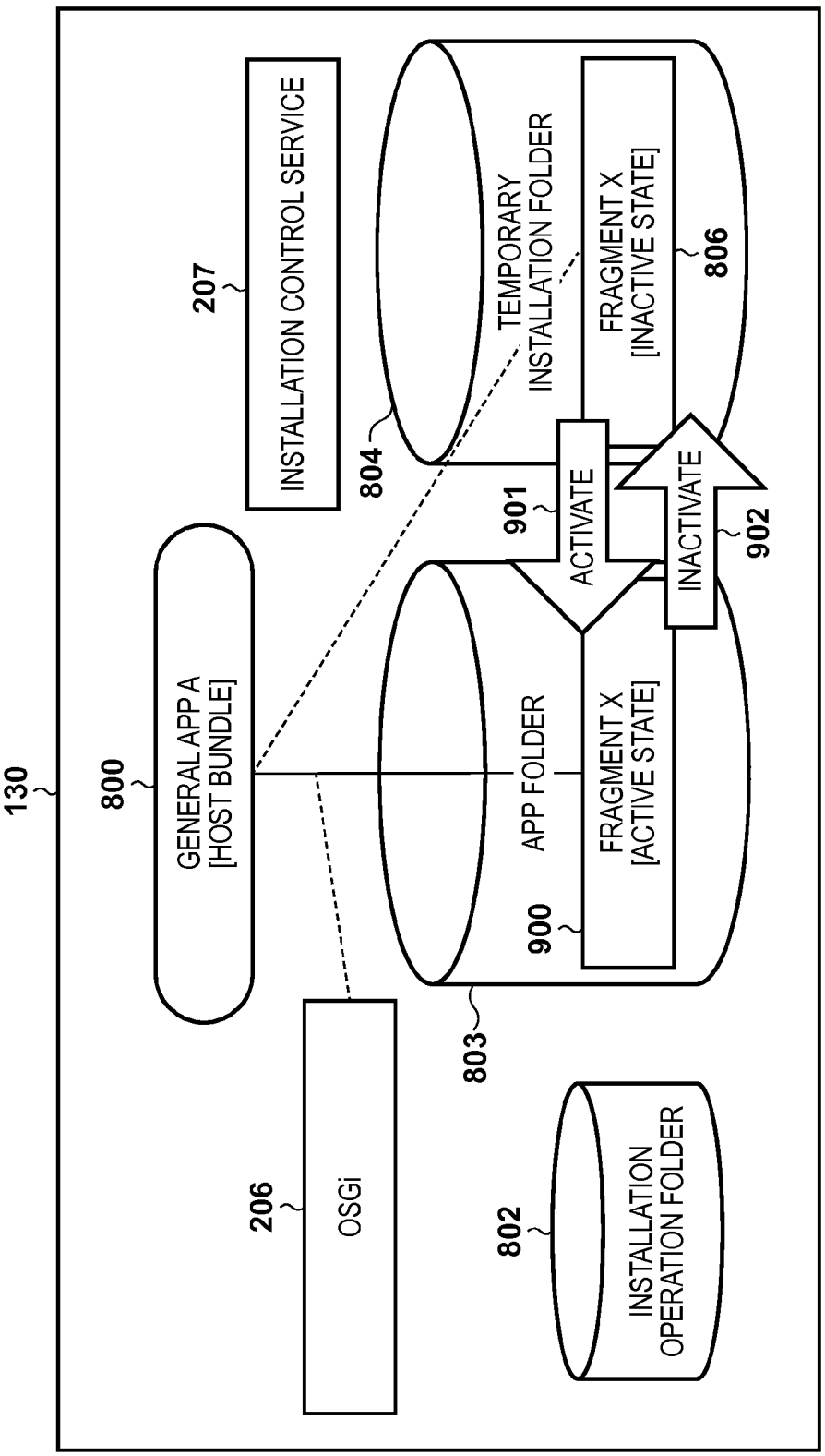
FIG. 9 is a block diagram for illustrating the first embodiment.

FIG. 9 is a diagram showing a flow of activating the fragment X 806 that has been temporarily installed in FIG. 8. The installation control service 207 performs processing for activating the fragment X 806 that has been temporarily installed in an inactive state, in accordance with an activation instruction 901 from the user. The installation control service 207 activates the fragment X 806 (i.e., attaches the fragment X 806 to the host bundle), and data of the fragment X 806 is thereby laid out in the app folder 803. When in this state, the fragment X 806 is under the management of the OSGi 206, and the OSGi 206 holds relevance between the general app A 800 and the fragment X 900.

On the other hand, the installation control service 207 performs processing for inactivating the fragment X 900 that has been installed in an active state, in accordance with an inactivation instruction 902 from the user. As a result of the inactivation processing, the fragment X 900 is again laid out in an inactive state in the temporary installation folder 804. Accordingly, data of a fragment is moved and the folder for storing the fragment is switched in accordance with an active state or an inactive state of the fragment.

Processing Sequence

Processing for a fragment bundle according to the present embodiment will be described below. Note that a conventional method is assumed to be used in installation and uninstallation of an app that is a host bundle, and a description thereof will be omitted here. Note that solid line arrows shown in FIGS. 10 to 13 indicate a processing request and data transmission, and broken line arrows indicate responses to the requests or the like.

Temporary Installation

Figure 10:
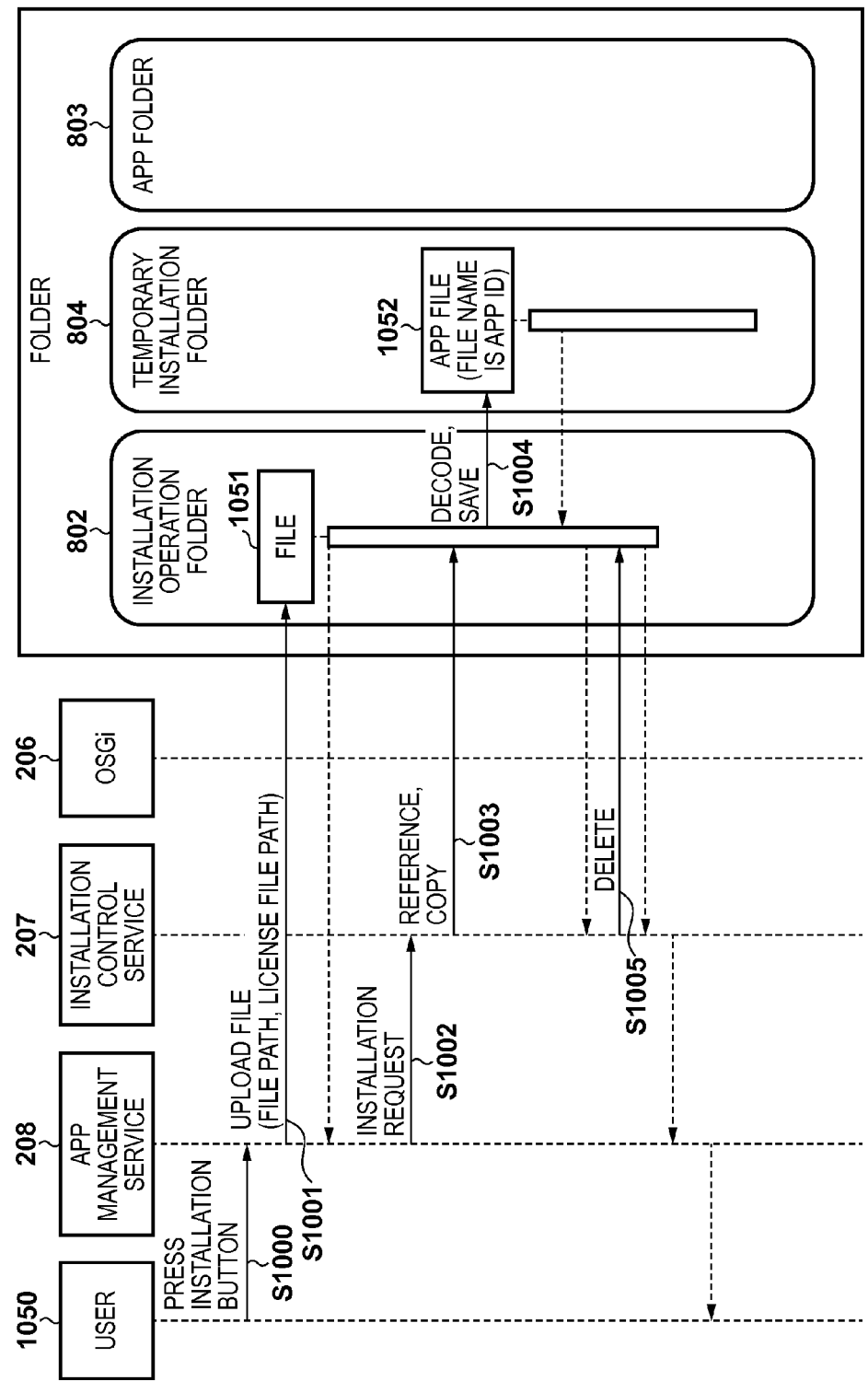
FIG. 10 is a sequence chart at the time of temporary installation according to the first embodiment.

FIG. 10 is a sequence chart showing a processing flow and a data flow in which a fragment bundle is temporarily installed by a user selecting the fragment bundle and pressing the installation button 535. Note that, in the present embodiment, each processing in the image forming apparatus 130 is achieved as an operation by the CPU 101 reading out and executing a corresponding program.

In step S1000, a user 1050 selects an app that the user wants to install and a corresponding license file, and presses the installation button 535. In step S1001, the app management service 208 uploads the designated app and license file (file 1051) in the installation operation folder 802.

In step S1002, the app management service 208 gives the installation control service 207 a request to install the designated app. Processing up to temporary installation is performed in response to the installation request here. In step S1003, the installation control service 207 decodes the app using the license file uploaded in the installation operation folder 802. Furthermore, if it is determined from the value of the manifest file of the app that the app is a fragment bundle, the installation control service 207 changes the file name of the decoded app file 1052 to the app ID of the app itself, and lays out the app in the temporary installation folder 804. At this time, as shown in FIG. 8, the app is laid out under a folder having the app ID of the host bundle as a folder name. In step S1005, the installation control service 207 deletes the app and the license file (file 1051) uploaded in the installation operation folder 802. As a result of the above processing, the fragment bundle is temporarily installed into the image forming apparatus 130, and enters an inactive state.

Activation

Figure 11:
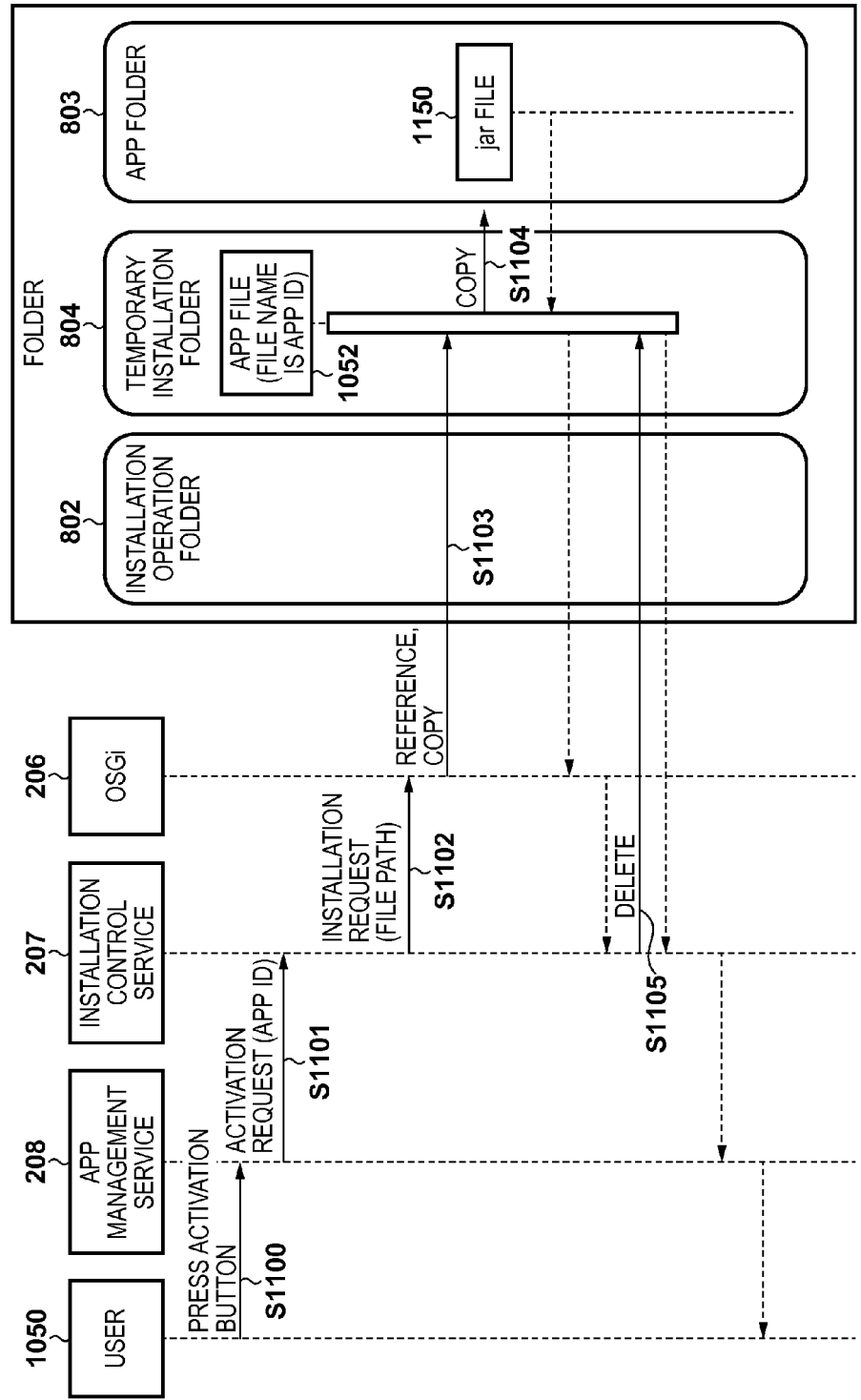
FIG. 11 is a sequence chart at the time of activation processing according to the first embodiment.

FIG. 11 is a sequence chart showing a processing flow and a data flow in which the fragment bundle is activated by the user 1050 pressing the activation button 515 of the fragment bundle in an inactive state after the processing in FIG. 10.

In step S1100, the user 1050 presses the activation button of the temporarily installed fragment bundle. In step S1101, the app management service 208 gives the installation control service 207 a request to perform activation processing, together with an app ID of the selected app (fragment bundle). In step S1102, the installation control service 207 gives the OSGi 206 a request to install the app, while designating a file path. Here, the file path is generated based on the app ID received from the app management service 208. Specifically, the file path is generated from the app ID of the designated fragment bundle and the app ID of the host bundle corresponding to this fragment bundle.

In step S1103, the OSGi 206 installs an app file 1052 that is laid out in the temporary installation folder 804 designated with the file path received from the installation control service 207. In step S1104, for the purpose of the installation, the OSGi 206 installs the app into a jar file 1150 having a name "ins0.jar" in the app folder 803. Note that the file name here is an example and is not limited thereto. After the installation is successful, in step S1105, the installation control service 207 deletes the app file 1052 laid out in the temporary installation folder. As a result of the above processing, the fragment bundle is activated and enters an active state.

Inactivation

Figure 12:
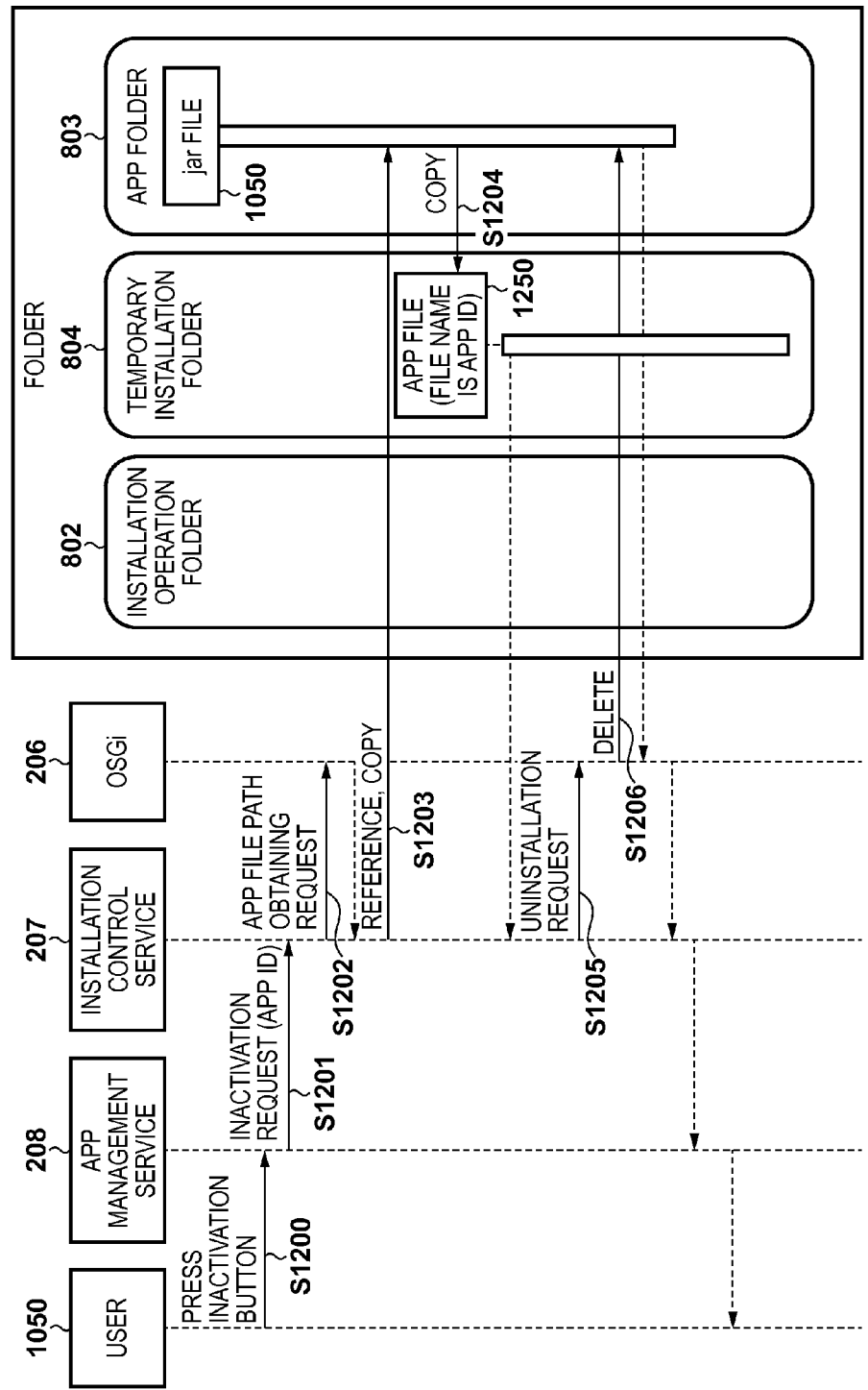
FIG. 12 is a sequence chart at the time of inactivation processing according to the first embodiment.

FIG. 12 is a sequence chart showing a processing flow and a data flow in which the fragment bundle is inactivated by the user 1050 pressing the inactivation button 514 of a fragment bundle in an active state after the processing in FIG. 11.

In step S1200, the user 1050 presses the inactivation button of the fragment file in an active state. In step S1201, the app management service 208 gives the installation control service 207 a request to perform inactivation processing, together with an app ID of a selected app (fragment bundle). In step S1202, the installation control service 207 obtains a file path of the jar file 1150 (ins0.jar) of the app from the OSGi 206. In step S1203, the installation control service 207 copies the jar file 1150 laid out in the app folder as an app file 1250 in the temporary installation folder 804, based on the file path obtained in step S1202. In step S1205, the installation control service 207 gives the OSGi 206 a request to uninstall the app. As a result of the uninstallation here, the fragment bundle enters a temporarily installed state. In step S1206, the OSGi 206 deletes the jar file 1150 (ins0.jar file) from the app folder 803. As a result of the above processing, the fragment bundle is inactivated and enters an inactive state.

Uninstallation

Figure 13:
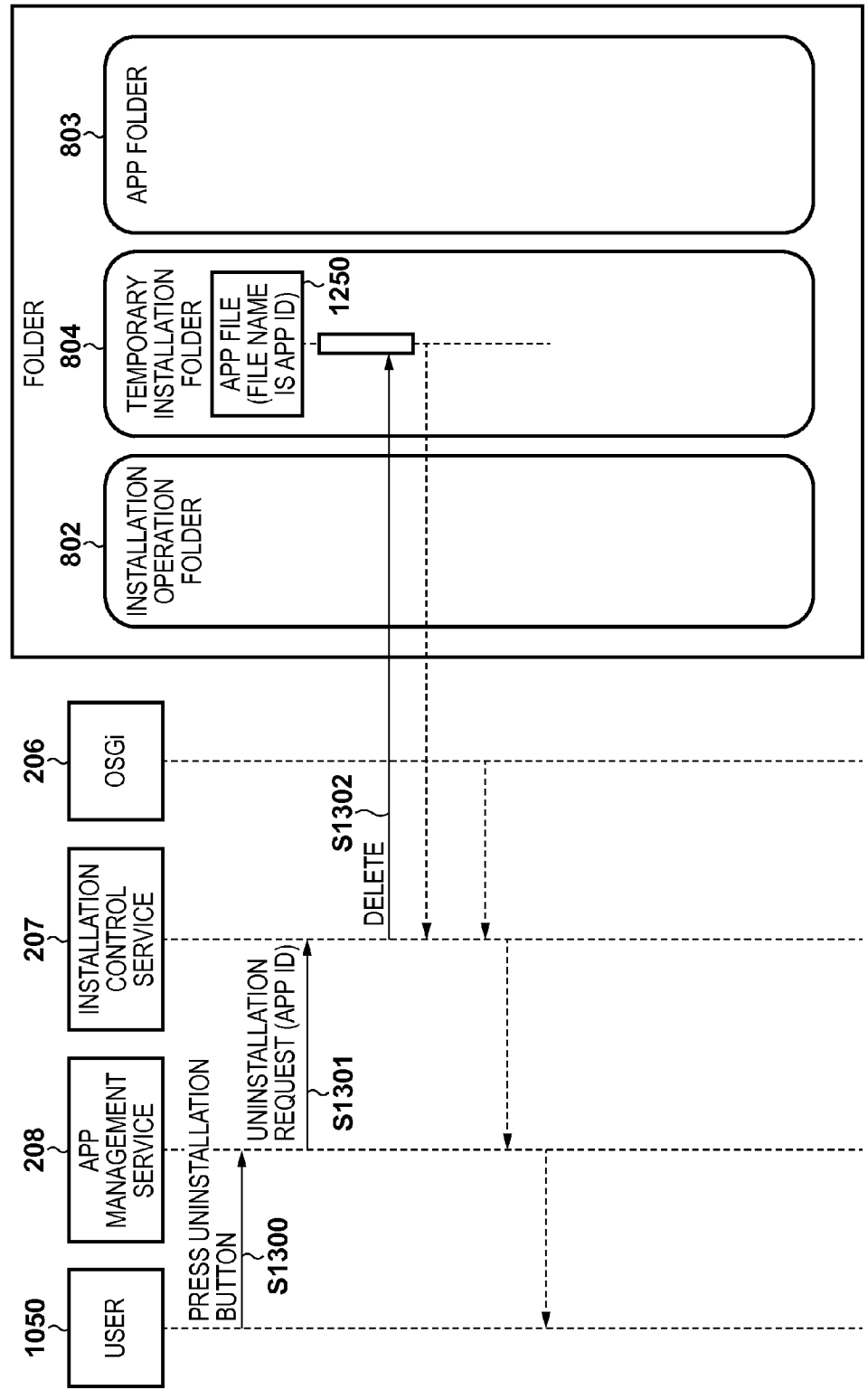
FIG. 13 is a sequence chart at the time of uninstallation according to the first embodiment.

FIG. 13 is a sequence chart showing a processing flow and a data flow in which a fragment bundle is uninstalled by the user 1050 pressing the uninstallation button 519 of a fragment bundle in an inactive state after the processing in FIG. 12.

In step S1300, the user 1050 presses the uninstallation button of a fragment bundle in an inactive state. In step S1301, the app management service 208 gives the installation control service 207 a request to perform uninstallation processing, together with an app ID of the selected app. The installation control service 207 deletes the app file 1250 from the temporary installation folder 804, based on the designated file path. Here, the file path is generated based on the app ID received from the app management service 208. As a result of the above processing, the fragment bundle in a temporarily installed state is uninstalled.

Generation of App Display List

Figure 14:
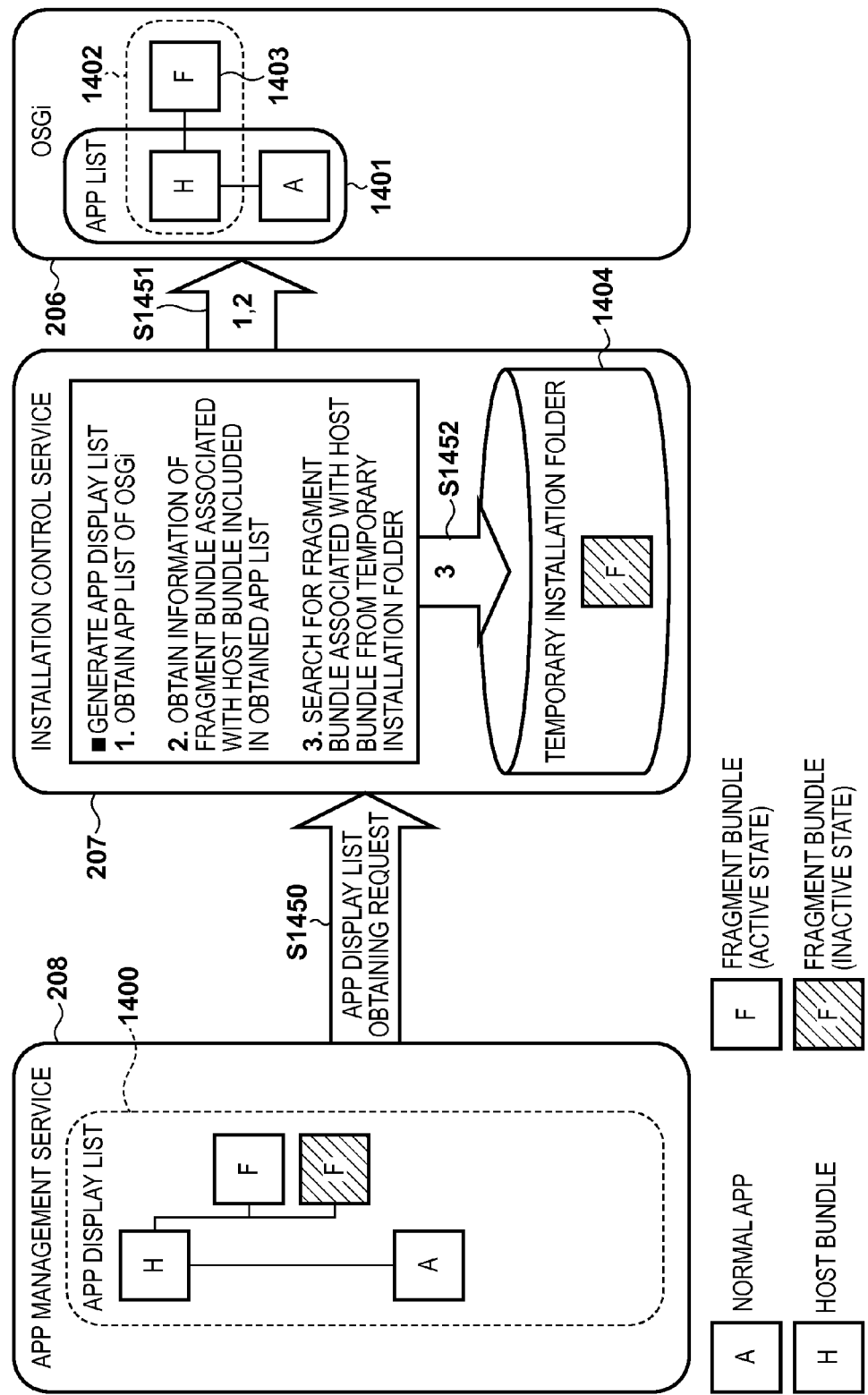
FIG. 14 is a diagram for illustrating app display list generation according to the first embodiment.

FIG. 14 is a diagram for illustrating a method by which the app management service 208 generates an app display list 1400 for displaying the app management screen 500 shown in FIG. 5.

In step S1450, the app management service 208 gives the installation control service 207 a request for information of the app display list. In step S1451, the installation control service 207 obtains an app list 1401 from the OSGi 206. Furthermore, the installation control service 207 gives the OSGi 206 an inquiry about whether or not a host bundle is included in the obtained app list 1401. The OSGi 206 holds relevance between the host bundle and the fragment bundle as indicated by a broken line 1402 when the fragment bundle is installed. Accordingly, the installation control service 207 can obtain information of the fragment bundle associated with the designated host bundle.

In step S1452, the installation control service 207 searches for the fragment bundle associated with the host bundle, from a temporary installation folder 1404. The app display list 1400 is generated based on the above information, and is provided to the app management service 208. The app management service 208 displays apps on the app management screen 500 in accordance with the information of the generated app display list 1400.

As described above, according to the present embodiment, a state of holding a fragment bundle without attaching it to a host bundle is provided by a method of a temporarily installed state. The amount of use of resources in the image forming apparatus can thereby be suppressed. Furthermore, temporary installation, activation, inactivation, and uninstallation from an inactive state of a fragment bundle can be controlled, and the status thereof can be managed and displayed.

Second Embodiment

In the present embodiment, a fragment bundle that is embedded in advance in firmware is set in a temporarily installed state described in the first embodiment, or is attached to a host bundle. The present embodiment is an example of further solving the aforementioned problem 2, in addition to the first embodiment.

FIG. 15 is a diagram for illustrating the present embodiment. In firmware 1501, an initialization list 1502 shown in FIG. 16, a system bundle A 1503, a fragment X 1504, and a fragment Y 1505 are laid out. Here, the fragment X 1504 and the fragment Y 1505 are fragment bundles whose host bundle is the system bundle A 1503. Assume that each data contained in the firmware 1501 is held in the HDD 104 or the like.

FIG. 16 shows content of the initialization list 1502, and shows setting information regarding control of app installation when the image forming apparatus 130 is started. An item 1600 of the initialization list 1502 is a name for specifying an app. A unique app ID may be designated as this name. An item 1601 (start) designates "start", "stop", "active", or "inactive" as an initial state of each app. Regarding the value of this item, "start" and "stop" are given to a system bundle. "Active" and "inactive" are given to fragment bundles. An item 1602 (startlevel) indicates a start level of each app. The OSGi 206 installs bundles laid out in the firmware 1501 in the ascending order of this value, and sets the bundles in the initial state conforming to the item 1601. Here, a description 1603 describes the system bundle A 1503, and indicates that the initial state is "start (on)" and the start level thereof is "5". A description 1604 describes the fragment X 1504, and indicates that the initial state is "active (on)" and the start level is "20". A description 1605 describes the fragment Y 1505, and indicates that the initial state is "inactive (off)" and the start level is "21".

Returning to the description of FIG. 15, the OSGi 206 installs the bundles in the ascending order of the value of the start level in accordance with the initialization list 1502 when the image forming apparatus 130 is first started. In this example, the OSGi 206 initially installs the system bundle A 1503 whose start level is "5". Thereafter, the OSGi 206 installs the fragment X 1504 whose start level is "20". At this time, the OSGi 206 installs the fragment X in an active state in accordance with the item 1601 in the initialization list 1502 (1506 in FIG. 5). Furthermore, the OSGi 206 installs the fragment Y 1505 whose start level is "21". At this time, the OSGi 206 temporarily installs the fragment Y 1505 in an inactive state in accordance with the item 1601 in the initialization list (1507 in FIG. 15).

Processing Flow

FIG. 17 is a flowchart of processing for installing a bundle at the time of start performed by the OSGi 206. This processing is achieved by the CPU 101 in the image forming apparatus 130 reading out and executing a program stored in the HDD 104 or the like.

Upon the bundle installation processing starting, in step S1701, the OSGi 206 reads the initialization list 1502. In step S1702, the OSGi 206 reads the manifest file of a bundle whose start level of the item 1602 in the initialization list 1502 takes the smallest value. In step S1703, the OSGi 206 determines whether the bundle of interest is a system bundle or a fragment bundle, based on the manifest file. If the bundle is a system bundle (NO in S1703), in step S1704, the OSGi 206 performs processing for installing the system bundle. After the installation processing, the processing proceeds to step S1708.

On the other hand, if the bundle of interest is a fragment bundle (YES in S1703), in step S1705, the OSGi 206 reads the initial state of the item 1601 in the initialization list 1502 and checks whether or not "ON" is designated. If "ON" is designated (YES in S1705), in step S1706, the OSGi 206 performs processing for activating the fragment bundle. On the other hand, if "OFF" is designated (NO in S1705), in step S1707, the OSGi 206 performs processing for inactivating the fragment bundle. In step S1708, the OSGi 206 checks whether or not all bundles included in the initialization list 1502 have been installed. If not all bundles have been installed (NO in S1708), the processing returns to step S1702, and the OSGi 206 executes processing for the next bundle. If all bundles have been installed (YES in S1708), this processing flow ends.

As described above, according to the present embodiment, a configuration can be provided in which a fragment bundle is temporarily installed in advance into the image forming apparatus without installing (attaching) the fragment bundle in a host bundle.

Third Embodiment

In the present embodiment, the number of fragment bundles that can be activated is restricted at the time of the processing for activating a fragment bundle from a temporarily installed state described in the first embodiment. The present embodiment is an example of further solving the aforementioned problem 3, in addition to the first embodiment.

Figure 18:
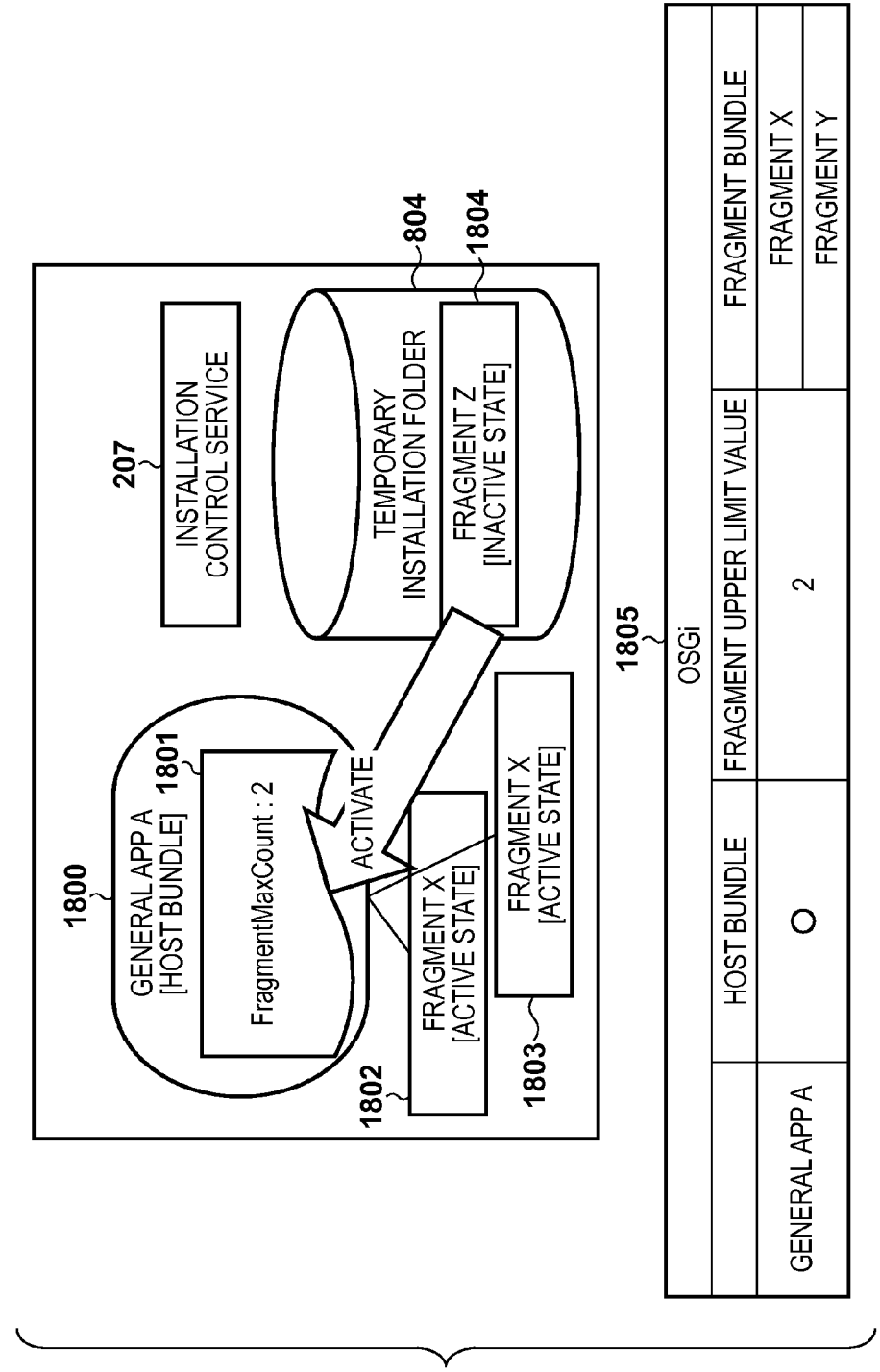
FIG. 18 is a block diagram for illustrating a third embodiment.

FIG. 18 is a block diagram for illustrating the present embodiment. "2" is written as a fragment upper limit value 1801 of a general app A 1800, which is a host bundle. A fragment X 1802 and a fragment Y 1803, which are fragment bundles, have been installed. Management status of the OSGi 206 in the memory in this case is shown as management status 1805. Furthermore, a fragment Z 1804 is a fragment bundle whose host bundle is the general app A 1800, and has been temporarily installed.

Consider activation of the fragment Z 1804 in this state. The installation control service 207 inquires the OSGi 206 of the fragment upper limit value (FragmentMaxCount) of the general app A 1800. In this case, "2" is obtained as the fragment upper limit value. The installation control service 207 also inquires the OSGi 206 of the current number of fragment bundles of the general app A 1800. In this case, "2" is obtained as the number of fragment bundles. In this situation, if the fragment Z 1804 is installed, the number of fragment bundles of the general app A 1800 exceeds the fragment upper limit value. Accordingly, the installation control service 207 does not permit activation of the fragment Z 1804.

Processing Flow

Installation Permission/Non-Permission Determination

Figure 19:
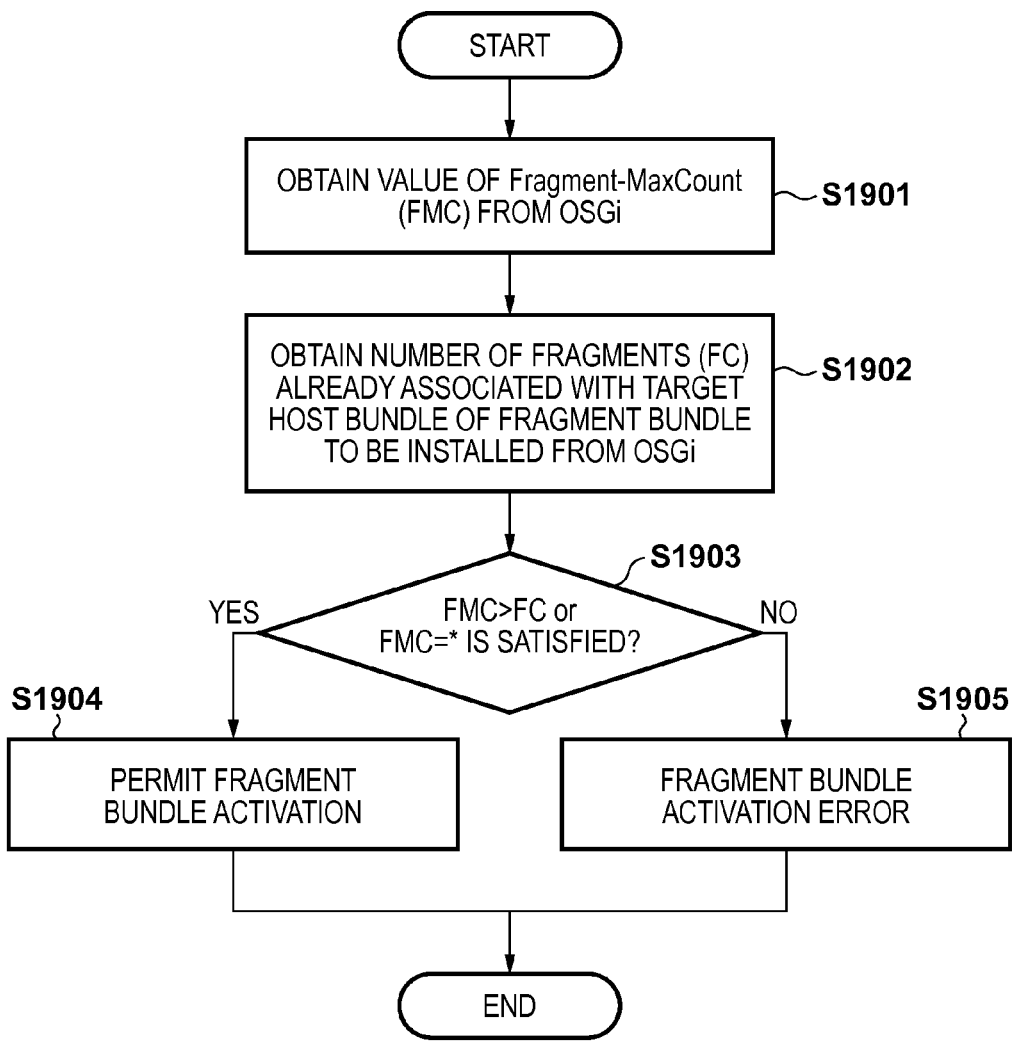
FIG. 19 is a processing flowchart of the installer control service according to the third embodiment.

FIG. 19 is a flowchart of determination of permission/non-permission of installation at the time of installing a fragment bundle in the situation shown in FIG. 18, the processing being performed by the installation control service 207. This processing flow is achieved by the CPU 101 in the image forming apparatus 130 reading out and executing a program stored in the HDD 104 or the like.

The installation control service 207 starts the processing in accordance with an activation instruction from the app management service 208 given by the user pressing the activation button. In step S1901, the installation control service 207 obtains the fragment upper limit value (FMC) of an installation target host bundle from the OSGi 206. Here, the FMC is obtained using the general app A, which is the installation target host bundle, and the fragment upper limit value as keys.

In step S1902, the installation control service 207 obtains, from the OSGi 206, the number of fragment bundles (FC) that have been added to the installation target host bundle. Here, the FC is obtained using the general app A, which is the installation target host bundle, and the fragment bundle as keys.

In step S1903, the installation control service 207 determines whether or not a condition "FMC>FC" or "FMC=*" is satisfied. If the above condition is satisfied (YES in S1903), in step S1904, the installation control service 207 permits activation of the fragment bundle. Then, the processing flow ends. On the other hand, if the above condition is not satisfied (NO in S1903), in step S1905, the installation control service 207 does not permit activation of the fragment bundle. Thereafter, the processing flow ends.

Installation Switching

Figure 20:
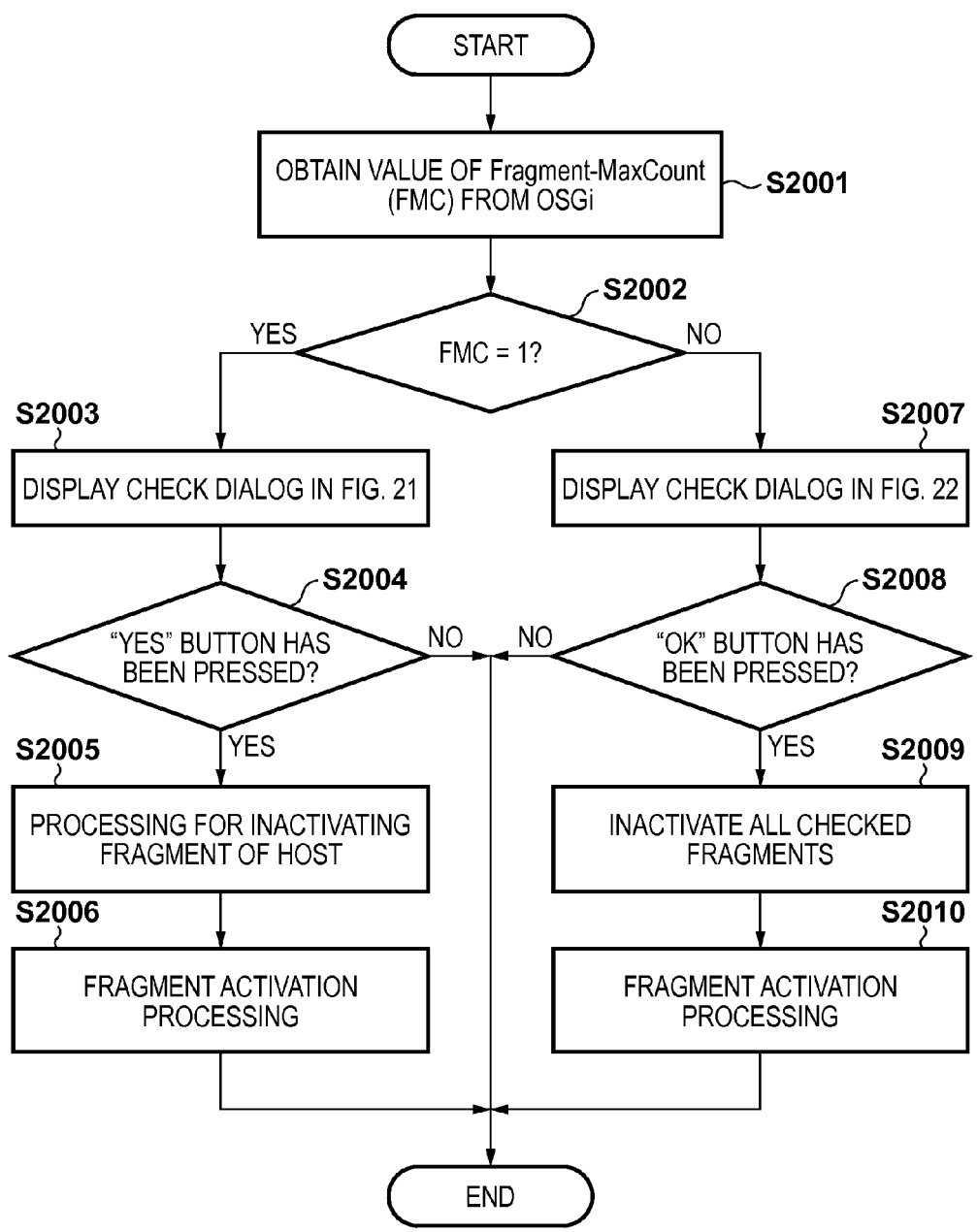
FIG. 20 is a processing flowchart of an app management service according to the third embodiment.

FIG. 20 shows exemplary processing that is different from the processing in FIG. 19. FIG. 20 shows a flowchart of processing for inactivating a current fragment bundle and activating a new fragment bundle when the number of fragment bundles that are already attached to the host bundle has already reached the upper limit number, rather than performing processing for handling this state as an error.

That is to say, processing for switching the fragment bundle to be attached is performed. This processing flow is achieved by the CPU 101 in the image forming apparatus 130 reading out and executing a program stored in the HDD 104 or the like.

In step S2001, the app management service 208 obtains the fragment upper limit value (FMC) of an installation target host bundle. In step S2002, the app management service 208 determines whether or not FMC=1. If FMC=1 (YES in S2002), in step S2003, the app management service 208 displays a check dialog 2100 shown in FIG. 21. FIG. 21 is a diagram showing an exemplary configuration of the check dialog 2100 in the case where the fragment upper limit value of the host bundle is "1". In this case, the number of fragment bundles installed for the host bundle is also 1.

In step S2004, the app management service 208 determines whether or not it has received a pressing of a "YES" button 2101 from the user. If a pressing of the "YES" button 2101 has been received (YES in S2004), only one fragment bundle is to be inactivated, and accordingly, in step S2005, the app management service 208 inactivates the currently attached fragment bundle. Thereafter, in step S2006, the app management service 208 performs processing for newly activating an activation target fragment bundle. Thereafter, the processing flow ends.

If the app management service 208 receives a pressing of a "NO" button 2102 (NO in S2004), the processing flow ends.

On the other hand, if the FMC is 2 or larger (NO in S2002), in step S2007, the app management service 208 displays a check dialog 2200 shown in FIG. 22. FIG. 22 is a diagram showing an exemplary configuration of the check dialog 2200 in the case where the fragment upper limit value of the host bundle is "2" or larger. Describing the situation shown in FIG. 18, the fragment upper limit value of the host bundle is "2", and the number of fragment bundles currently installed for the host bundle is also "2". Accordingly, it is necessary to check with the user which of the activated fragment bundles to inactivate. For this reason, the app management service 208 receives a selection of the fragment bundle to be inactivated from the user through check boxes 2201 and 2202 in the check dialog 2200.

In step S2008, the app management service 208 determines whether or not one or more fragment bundles have been selected by the user and a pressing of an "OK" button 2203 has been received. If a pressing of the "OK" button 2203 has been received (YES in S2008), in step S2009, the app management service 208 inactivates all selected fragment bundles. Thereafter, in step S2010, the app management service 208 performs processing for activating the fragment bundle that is to be activated. Thereafter, the processing flow ends.

If the app management service 208 receives a pressing of a "Cancel" button 2204 (NO in S2008), the processing flow ends.

As described above, according to the present embodiment, the processing for installing fragment bundles can be controlled based on the upper limit number of fragment bundles.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-117097, filed Jun. 5, 2014, which is hereby incorporated by reference herein in its entirety.

What is claimed is:

1. An information processing apparatus in which an application operates, the information processing apparatus comprising:
 a framework that causes a first application and a second application for extending the first application to operate;
 a processor and a memory cooperating to function as
  an installation control unit configured to control installation of an application into the framework; and
 a first storage area and a second storage area,
 wherein the installation control unit:
  (a) performs temporary installation by holding data of the second application in the first storage area in a case of receiving an instruction to install the second application,
  (b) moves the data of the second application held in the first storage area from the first storage area to the second storage area in which data of an installed application is held, and performs installation of the second application, in a case of receiving a second instruction, which instructs to activate the second application, after receiving the first installation instruction to install the second application,
  (c) performs temporary installation again by moving the data of the second application from the second storage area to the first storage area, in a case of the receiving a third instruction, which instructs to inactivate the second application, after receiving the second instruction to activate the second application, and
  (d) performs uninstallation by deleting the data of the second application held in the first storage area, in case of receiving a fourth instruction, which instructs to uninstall the second application, after receiving the third instruction to inactivate the second application.

2. The information processing apparatus according to claim 1, wherein the installation control unit further displays a management screen for receiving instructions to install, uninstall, activate, and inactivate the second application.

3. The information processing apparatus according to claim 2, wherein the management screen displays the first application and the second application that extends the first application in association with each other.

4. The information processing apparatus according to claim 1, wherein the processor and the memory further cooperate to function as a unit configured to hold data of the first application, the data of the second application, and setting information of installation at the time when the information processing apparatus is started,
wherein the installation control unit controls installation of the first application and the second application at the time of the start, based on the setting information.

5. The information processing apparatus according to claim 1, wherein the framework is Open Services Gateway Initiative (OSGi),
wherein the first application is a host bundle in the OSGi, and
wherein the second application is a fragment bundle in the OSGi.

6. A method for managing an application in an information processing apparatus, the information processing apparatus including a framework that causes a first application and a second application for extending the first application to operate, a first storage area, and a second storage area, the method comprising:
performing temporary installation by holding data of the second application in the first storage area in a case of receiving an instruction to install the second application;
moving the data of the second application held in the first storage area from the first storage area to the second storage area in which data of an installed application is held, and performing installation of the second application, in a case of receiving a second instruction, which instructs to activate the second application, after receiving the instruction to install the second application;
performing temporary installation again by moving the data of the second application from the second storage area to the first storage area, in a case of receiving a third instruction, which instructs to inactivate the second application, after receiving the second instruction to activate the second application; and
performing uninstallation by deleting the data of the second application held in the first storage area, in case of receiving a fourth instruction, which instructs to uninstall the second application, after receiving the third instruction to inactivate the second application.

7. A non-transitory computer-readable medium storing a program for causing a computer including a framework, which causes a first application and a second application for extending the first application to operate, a first storage area, and a second storage area, to execute steps comprising:

performing temporary installation by holding data of the second application in the first storage area, in a case of receiving an instruction to install the second application;
moving the data of the second application held in the first storage area from the first storage area to the second storage area in which data of an installed application is held, and performing installation of the second application, in a case of receiving a second instruction, which instructs to activate the second application, after receiving the first installation instruction to install the second application;
performing temporary installation again by moving the data of the second application from the second storage area to the first storage area, in a case of receiving a third instruction, which instructs to inactivate the second application, after receiving the second instruction to activate the second application; and
performing uninstallation by deleting the data of the second application held in the first storage area, in case of receiving a fourth instruction, which instructs to uninstall the second application, after receiving the third instruction to inactivate the second application.

8. The information processing apparatus according to claim 1, wherein the installation control unit (a) in a case of receiving the instruction to install the second application, holds the data of the second application and a license file of the second application in the first storage area, and (b) in a case of receiving the second instruction which instructs to activate the second application after receiving the instruction to install the second application, moves the data of the second application and the license file of the second application held in the first storage area from the first storage area to the second storage area in which data of an installed application is held, and installs the second application.

9. The information processing apparatus according to claim 8, wherein the processor and the memory further cooperate to function as a unit configured to hold information of an upper limit of the number of second applications that can be installed so as to extend the first application,
wherein the installation control unit controls installation by laying out the data of the second application in the first storage area or the second storage area, based on the information of the upper limit.

10. The information processing apparatus according to claim 9, wherein the installation control unit
(a) determines whether or not the number of installed second applications exceeds the upper limit as a result of installation of a new second application, in a case of receiving an instruction to install the new second application,
(b) receives designation of a second application to be inactivated among already installed second applications, in a case where it is determined that the number of installed second applications exceeds the upper limit, and
(c) moves the data of the designated second application from the second storage area to the first storage area and uninstalls the designated second storage area from the framework.

* * * * *